US012734857B1

(12) United States Patent
Hrusch et al.

(10) Patent No.: US 12,734,857 B1
(45) Date of Patent: Sep. 15, 2026

(54) HYDROMECHANICAL ANTI-ROLL BAR DISCONNECT

(71) Applicant: Schaeffler Technologies AG & Co. KG, Herzogenaurach (DE)

(72) Inventors: Nicholas Hrusch, Wooster, OH (US); Todd Sturgin, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/343,666

(22) Filed: Sep. 29, 2025

(51) Int. Cl.
*B60G 21/055* (2006.01)
*B60G 17/027* (2006.01)

(52) U.S. Cl.
CPC ..... *B60G 21/0556* (2013.01); *B60G 17/0277* (2013.01); *B60G 2202/135* (2013.01); *B60G 2202/413* (2013.01); *B60G 2206/427* (2013.01); *B60G 2300/07* (2013.01); *B60G 2800/012* (2013.01)

(58) Field of Classification Search
CPC .............. B60G 21/0556; B60G 21/055; B60G 21/0551; B60G 21/0553; B60G 21/0558; B60G 2202/413; B60G 2202/135; B60G 2202/44; B60G 2202/441; B60G 2206/427; B60G 2300/07; B60G 2204/4605; B60G 2800/012; B60G 2800/0122; B60G 17/0277; B60G 17/027; F16F 1/14
USPC ........ 280/124.106, 5.511, 124.152, 124.166; 267/283, 188
See application file for complete search history.

(56) References Cited

U.S. PATENT DOCUMENTS 4,206,935 A * 6/1980 Sheppard ........... B60G 21/0556 280/124.102
5,749,596 A * 5/1998 Jensen ...................... F16F 9/46 188/300
6,328,323 B1 * 12/2001 Elser .................. B60G 21/0556 280/124.152
(Continued)

FOREIGN PATENT DOCUMENTS

CN 116262411 A * 6/2023 ........... B60G 21/055
CN 119567787 A * 3/2025 ......... B60G 21/0556
(Continued)

*Primary Examiner* — Keith J Frisby
(74) *Attorney, Agent, or Firm* — Suiter Swantz IP

(57) ABSTRACT

An anti-roll bar may include a hydromechanical disconnect. The hydromechanical disconnect may use windup torque as an actuating force to disconnect the hydromechanical disconnect. Hubs of the hydromechanical disconnect may be axially separated due to an axial separating force produced in face splines of the hubs. An oil control valve may control the disconnecting motion depending on the desired mode of the hydromechanical disconnect. The oil control valve controls the flow of fluid between advance and retract chambers defined by the hydromechanical disconnect. Flow from the advance chamber to the retract chamber may maintain the hydromechanical disconnect in a connected position. Flow between both the advance chamber and the retract chamber may allow translation of the hydromechanical disconnect between the non-rotatably connected position and a disconnected position. Flow blocked between the advance chamber and the retract chamber may maintain the hydromechanical disconnect in the disconnected position.

20 Claims, 15 Drawing Sheets

100

(56) References Cited

U.S. PATENT DOCUMENTS

| | | | | |
|---|---|---|---|---|
| 6,439,583 | B1 * | 8/2002 | Markowetz | B60G 21/0556 280/5.511 |
| 6,513,819 | B1 | 2/2003 | Oliver et al. | |
| 11,858,306 | B2 | 1/2024 | Kraus et al. | |
| 11,993,127 | B2 | 5/2024 | Hilty | |
| 12,070,984 | B1 | 8/2024 | Lee et al. | |
| 12,220,964 | B2 | 2/2025 | Lee | |
| 12,319,109 | B2 | 6/2025 | Lee et al. | |
| 2005/0121841 | A1 * | 6/2005 | Gradu | B60G 21/0556 267/186 |
| 2007/0108707 | A1 * | 5/2007 | Kobayashi | B60G 17/0162 280/5.511 |
| 2008/0000710 | A1 * | 1/2008 | Vortmeyer | B60G 21/0556 180/282 |
| 2008/0191430 | A1 | 8/2008 | Grannemann et al. | |
| 2019/0241039 | A1 * | 8/2019 | Simula | B60G 21/0551 |
| 2020/0198435 | A1 | 6/2020 | Dhanraj et al. | |
| 2020/0361272 | A1 * | 11/2020 | Jackson | B60G 21/0556 |
| 2021/0008950 | A1 * | 1/2021 | Kuwayama | B60G 21/0556 |
| 2023/0415534 | A1 * | 12/2023 | Schröder | B60G 17/025 |

FOREIGN PATENT DOCUMENTS

| | | | | |
|---|---|---|---|---|
| DE | 202007013613 | U1 * | 2/2009 | F15B 15/12 |
| DE | 102016204716 | A1 | 9/2017 | |
| EP | 1157865 | A2 * | 11/2001 | B60G 21/0553 |
| JP | H035224 | A * | 1/1991 | |
| KR | 20040026353 | A * | 3/2004 | B60G 21/0556 |

* cited by examiner

100

100

300

300

300

HYDROMECHANICAL ANTI-ROLL BAR DISCONNECT

TECHNICAL FIELD

The present disclosure generally relates to stabilizer bars, and more particularly, to stabilizer bars including a releasable coupling.

BACKGROUND

Many modern vehicle suspensions include stabilizer bars. Stabilizer bars can equalize a vertical movement of the left and right wheels relative to the vehicle frame or body. However, in some situations it can be desirable to disconnect the stabilizer bar and have large vertical movement of a wheel on one side of the vehicle without a corresponding vertical movement on the other side. Independent movement of left and right wheels is helpful for keeping wheels on the ground and providing clearance over obstacles.

SUMMARY

A hydromechanical disconnect is described, in accordance with one or more embodiments of the present disclosure. The hydromechanical disconnect may include: a housing including an input housing and an output housing, the input housing and the output housing being affixed together; an input hub, the input hub and the input housing being rotatably connected, axially connected, and sealed together; an output hub, the output hub and the output housing being sealed together; an output tube, the output hub and the output tube being affixed, the output tube and the output housing being non-rotatably connected and sealed together, the output hub configured to axially translate relative to the input hub between a non-rotatably connected position and a disconnected position, the input hub and the output hub being non-rotatably connected in the non-rotatably connected position, the input hub being disconnected and configured to rotate relative to the output hub in the disconnected position, the output hub configured to disconnect from the input hub due to torque between the input hub and the output hub, the input hub and the output tube being sealed together, a return spring returning the output hub to the non-rotatably connected position; an advance chamber defined by the input hub, the input housing, the output housing, the output hub, and the output tube; a retract chamber defined by the output housing, the output hub, and the output tube, the output hub separating the advance chamber from the retract chamber, the advance chamber and the retract chamber holding a hydraulic fluid; a manifold fluidically coupling the hydraulic fluid between the advance chamber and the retract chamber; and an oil control valve controlling axial motion of the output hub relative to the input hub by controlling a flow of the hydraulic fluid through the manifold.

In some aspects, the hydromechanical disconnect may include: a bearing, wherein the input hub and the input housing are axially connected and rotatably connected by the bearing.

In some aspects, the hydromechanical disconnect may include: an outer bearing nut axially connecting an outer race of the bearing to the input housing, wherein the input housing includes an input-housing threaded-portion, wherein the output housing includes an output-housing threaded-portion, wherein the outer bearing nut and the output-housing threaded-portion are each affixed to the input-housing threaded-portion.

In some aspects, the input hub includes an input-hub face-spline, wherein the output hub includes an output-hub face-spline, wherein the input-hub face-spline and the output-hub face-spline are non-rotatably connected in the non-rotatably connected position, wherein torque between the input-hub face-spline and the output-hub face-spline causes the axial motion of the output hub relative to the input hub.

In some aspects, the input-hub face-spline and the output-hub face-spline include spline top-lands, spline bottom-lands, and spline teeth, wherein the spline teeth are circumferentially disposed between and axially connect the spline top-lands and the spline bottom-lands, wherein the input-hub face-spline and the output-hub face-spline are non-rotatably connected by the spline teeth of the input-hub face-spline and the spline teeth of the output-hub face-spline, wherein the spline top-lands of the input-hub face-spline and the spline top-lands of the output-hub face-spline abut when the input-hub face-spline and the output-hub face-spline are disconnected, wherein torque between the spline teeth of the input-hub face-spline and the spline teeth of the output-hub face-spline causes the axial motion of the output hub relative to the input hub.

In some aspects, the input hub defines an input-hub radial-portion and an input-hub blind-hole, wherein the input-hub face-spline extends axially from the input-hub radial-portion, wherein the input-hub blind-hole is disposed radially inwards of and axially aligned with the input-hub radial-portion, wherein the output tube is sealed to the input-hub blind-hole.

In some aspects, the output hub is configured to disconnect from the input hub when torque is applied in either direction.

In some aspects, the return spring is disposed in the retract chamber, wherein the return spring connects between the output hub and the output housing.

In some aspects, the oil control valve is configurable between a one-way mode, a passthrough mode, and a blocked mode, wherein the output hub is configured to axially translate towards the input hub and is prevented from being axially translated away from the input hub when the oil control valve is configured in the one-way mode, wherein the output hub is configured to axially translate towards and away from the input hub when the oil control valve is configured in the passthrough mode, wherein the output hub is blocked from axially translating towards and away from the input hub when the oil control valve is configured in the blocked mode.

In some aspects, the input hub is configured to rotate relative to the output hub when the oil control valve is configured in the blocked mode and the output hub is in the disconnected position.

In some aspects, the one-way mode is a default condition with power off to the oil control valve.

In some aspects, the hydromechanical disconnect may include: a sensor configured to control the oil control valve by detecting the output hub.

In some aspects, the sensor is affixed to the output housing, is configured to detect the output hub is at the disconnected position, and causes the oil control valve to be configured in the blocked mode in response to detecting the output hub is at the disconnected position.

In some aspects, the hydromechanical disconnect may include: a pin, wherein the pin non-rotatably connects the output housing and the output tube, wherein the output housing, the output tube, and the pin are configured to balance air pressure within the input hub and the output tube with atmospheric pressure.

In some aspects, the pin is affixed to the output tube, wherein the output tube defines an output-tube keyway, wherein the output housing defines an output-housing keyway, wherein the pin fluidically couples the output-tube keyway and the output-housing keyway, wherein the pin is configured to axially translate along the output-housing keyway with axial translation of the output hub and the output tube.

In some aspects, the oil control valve includes a valve spring, a valve actuator, a valve ring, and a valve poppet.

In some aspects, the hydromechanical disconnect may include: a rotary seal dynamically sealing the input hub to the input housing, a tube-to-housing seal affixed to the output housing and sealing the output tube to the output housing, a hub-to-housing seal affixed to the output hub and sealing the output hub to the output housing, a hub-to-tube seal affixed to the output tube and sealing the output tube to the input hub.

In some aspects, the housing houses the input hub, the output hub, the output tube, the return spring, the advance chamber, and the retract chamber.

In some aspects, the manifold defines a manifold retract port and a manifold advance port, wherein the advance chamber and the retract chamber are fluidically connected to respective of the manifold advance port and the manifold retract port, wherein the manifold retract port and the manifold advance port extend through the output housing and are uncovered by the output hub in the non-rotatably connected position and the disconnected position.

An anti-roll bar is described, in accordance with one or more embodiments of the present disclosure. The anti-roll bar may include: a hydromechanical disconnect including: a housing including an input housing and an output housing, the input housing and the output housing being affixed together; an input hub, the input hub and the input housing being rotatably connected, axially connected, and sealed together; an output hub, the output hub and the output housing being sealed together; an output tube, the output hub and the output tube being affixed, the output tube and the output housing being non-rotatably connected and sealed together, the output hub configured to axially translate relative to the input hub between a non-rotatably connected position and a disconnected position, the input hub and the output hub being non-rotatably connected in the non-rotatably connected position, the input hub being disconnected and configured to rotate relative to the output hub in the disconnected position, the output hub configured to disconnect from the input hub due to torque between the input hub and the output hub, the input hub and the output tube being sealed together, a return spring returning the output hub to the non-rotatably connected position; an advance chamber defined by the input hub, the input housing, the output housing, the output hub, and the output tube; a retract chamber defined by the output housing, the output hub, and the output tube, the output hub separating the advance chamber from the retract chamber, the advance chamber and the retract chamber holding a hydraulic fluid; a manifold fluidically coupling the hydraulic fluid between the advance chamber and the retract chamber; and an oil control valve controlling axial motion of the output hub relative to the input hub by controlling a flow of the hydraulic fluid through the manifold; an input rollbar affixed to the input hub; and an output rollbar affixed to the output tube.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
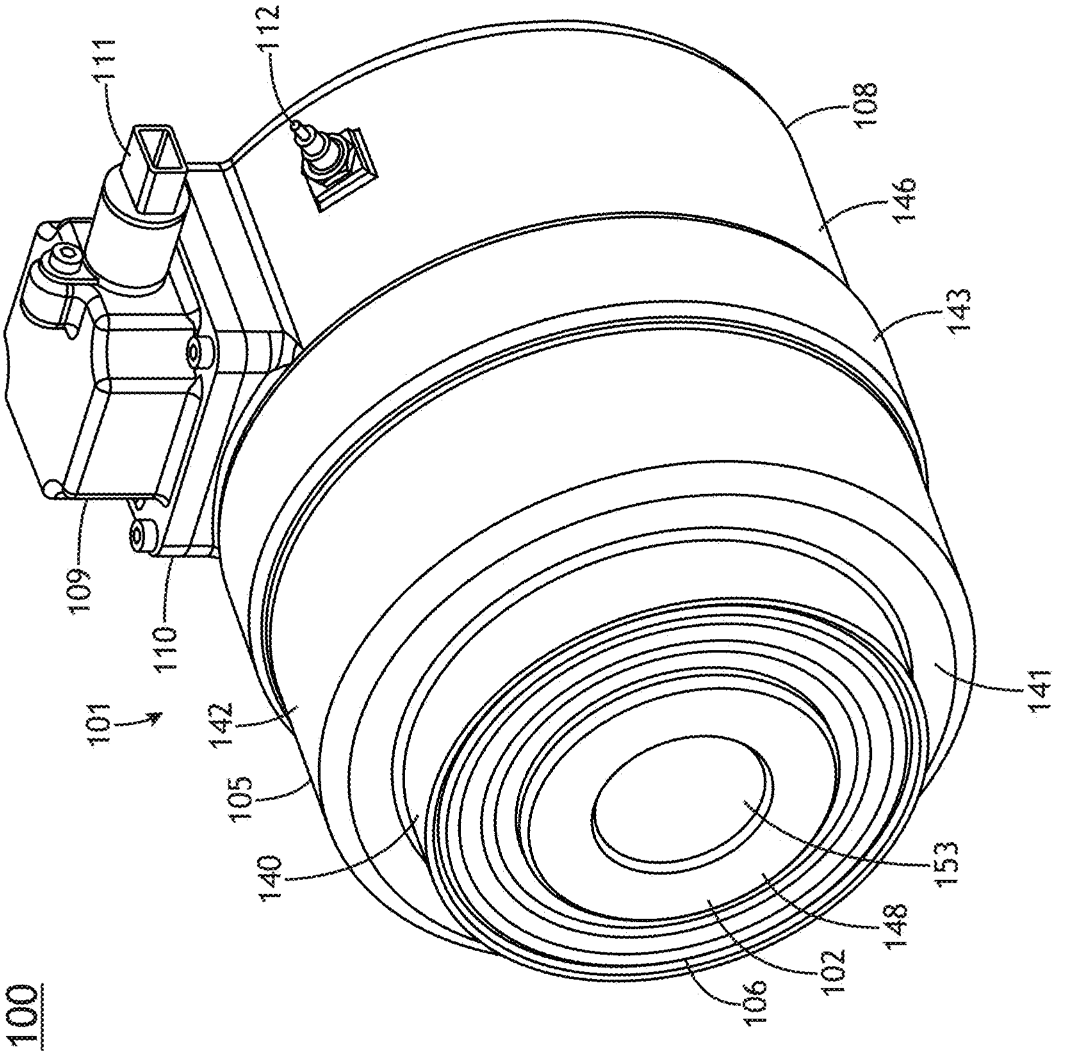
FIG. 1A illustrates a perspective view of a hydromechanical disconnect, in accordance with one or more embodiments of the present disclosure.
Figure 1B:
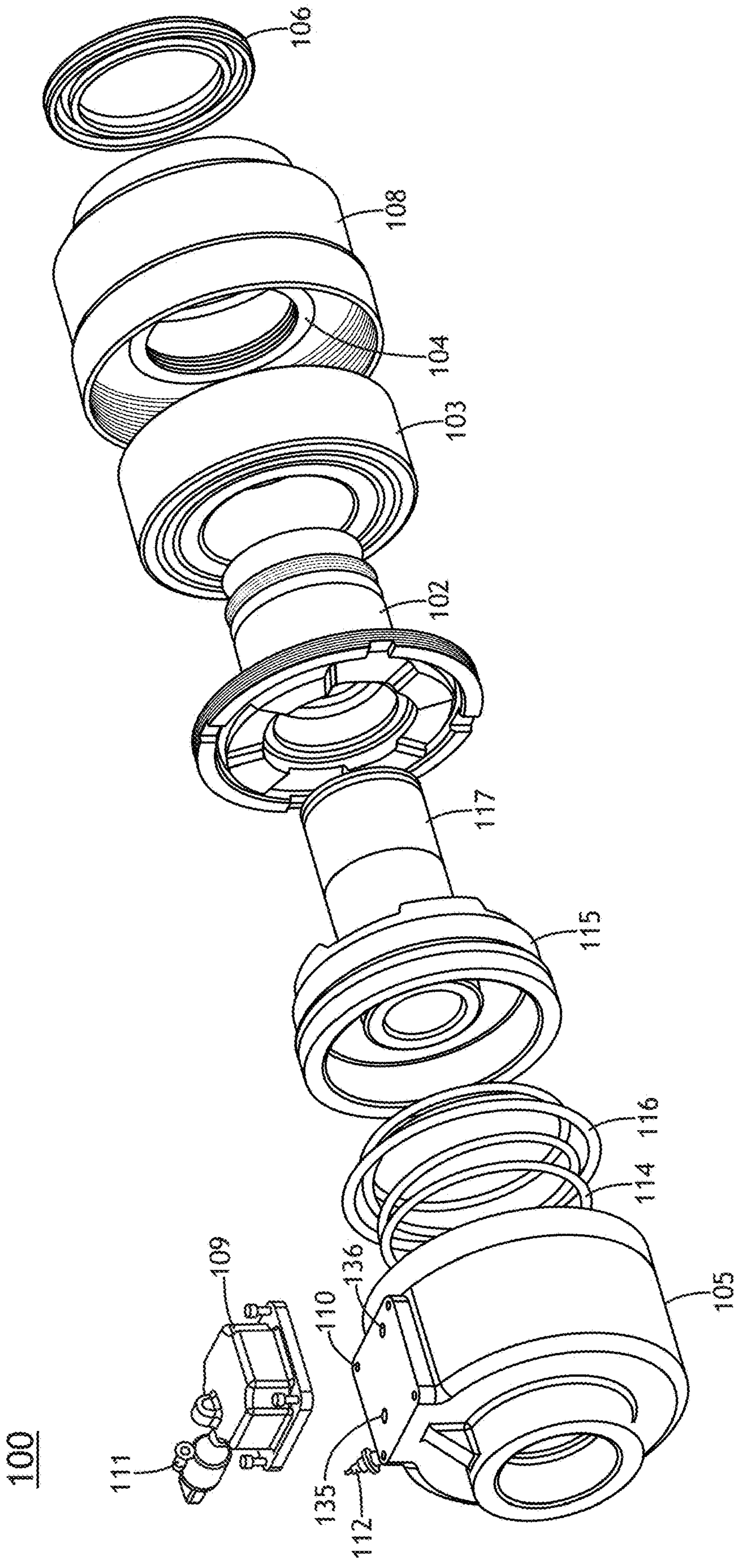
FIG. 1B illustrates an exploded view of the hydromechanical disconnect, in accordance with one or more embodiments of the present disclosure.
Figure 1C:
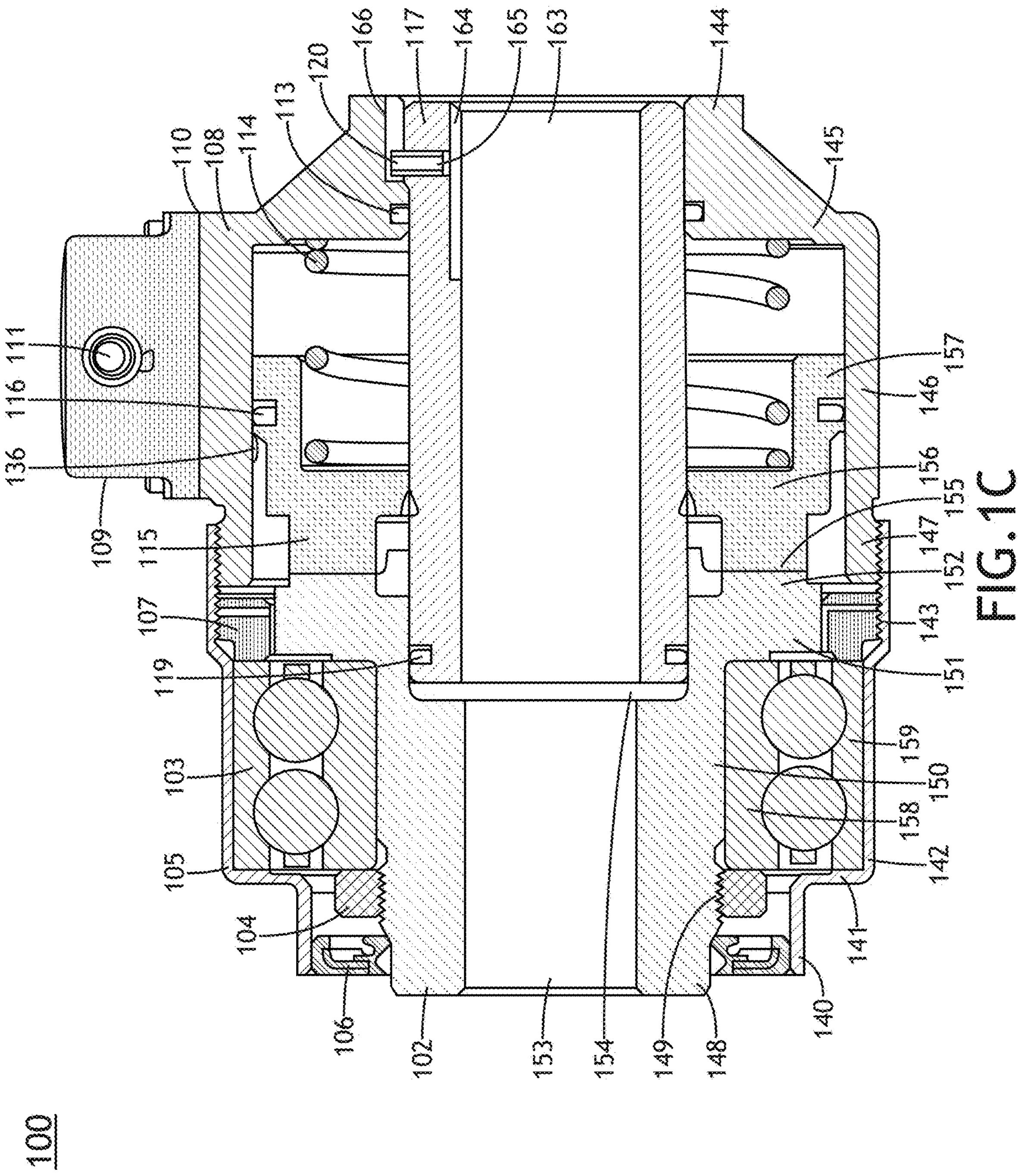
FIG. 1C illustrates a cross-sectional view of the hydromechanical disconnect along the center axis with an output hub in a non-rotatably connected position relative to an input hub, in accordance with one or more embodiments of the present disclosure.
Figure 1D:
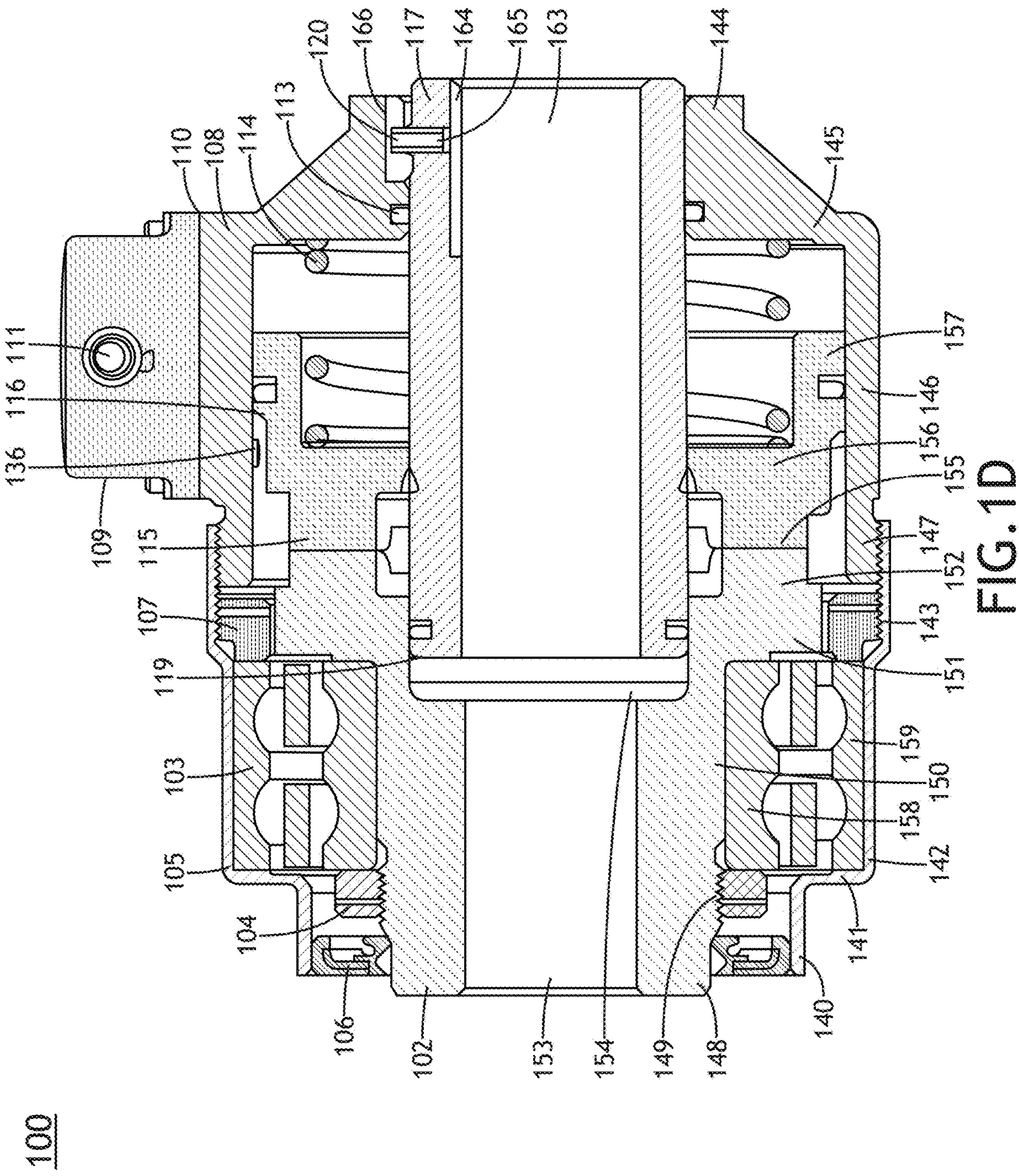
FIG. 1D illustrates a cross-sectional view of the hydromechanical disconnect along the center axis with the output hub in a disconnected position relative to the input hub, in accordance with one or more embodiments of the present disclosure.
Figure 1E:
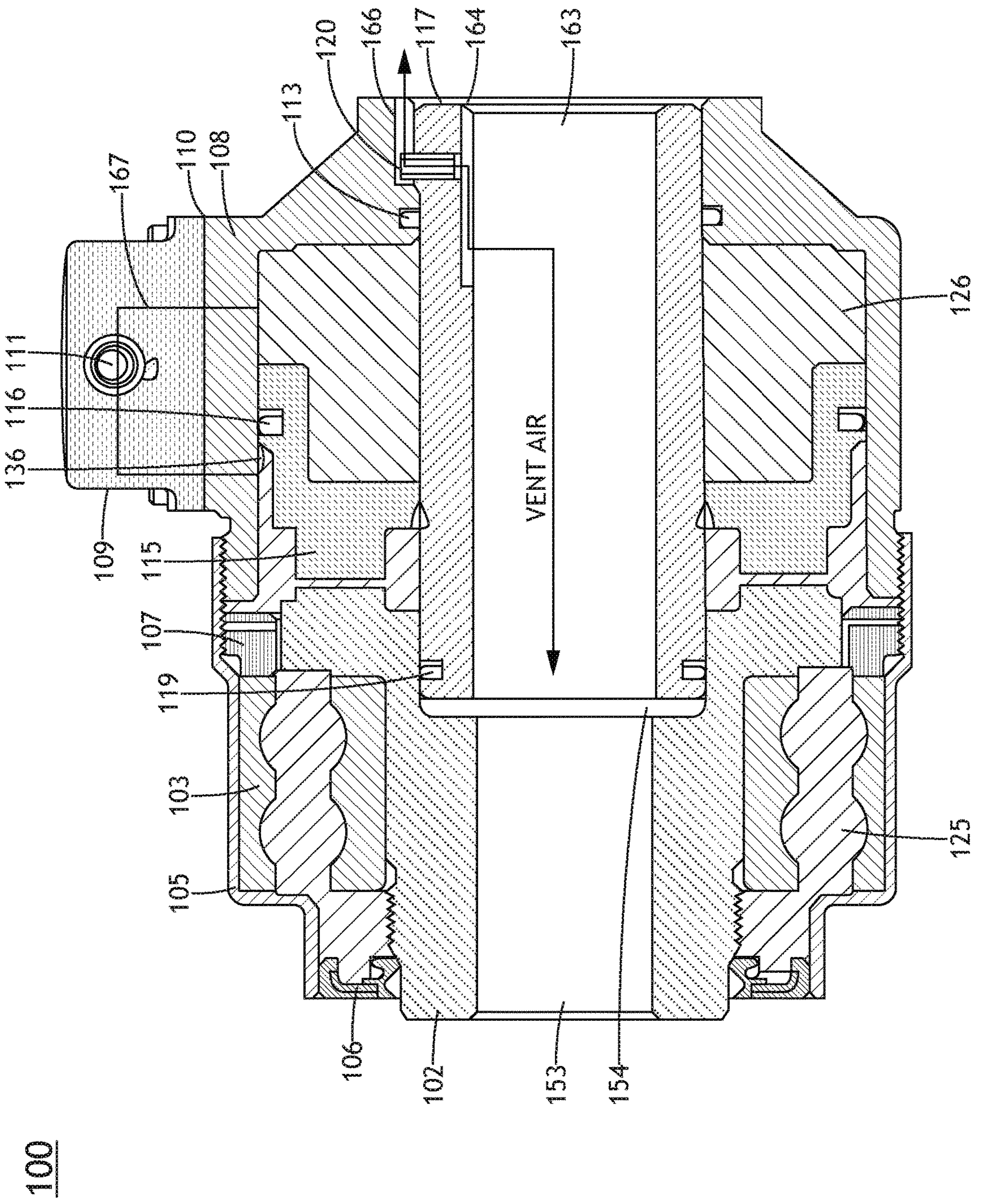
FIG. 1E illustrates a cross-sectional view of the hydromechanical disconnect along the center axis with the output hub in the non-rotatably connected position and with hydraulic fluid in advance and retract chambers connected through a manifold, in accordance with one or more embodiments of the present disclosure.
Figure 1F:
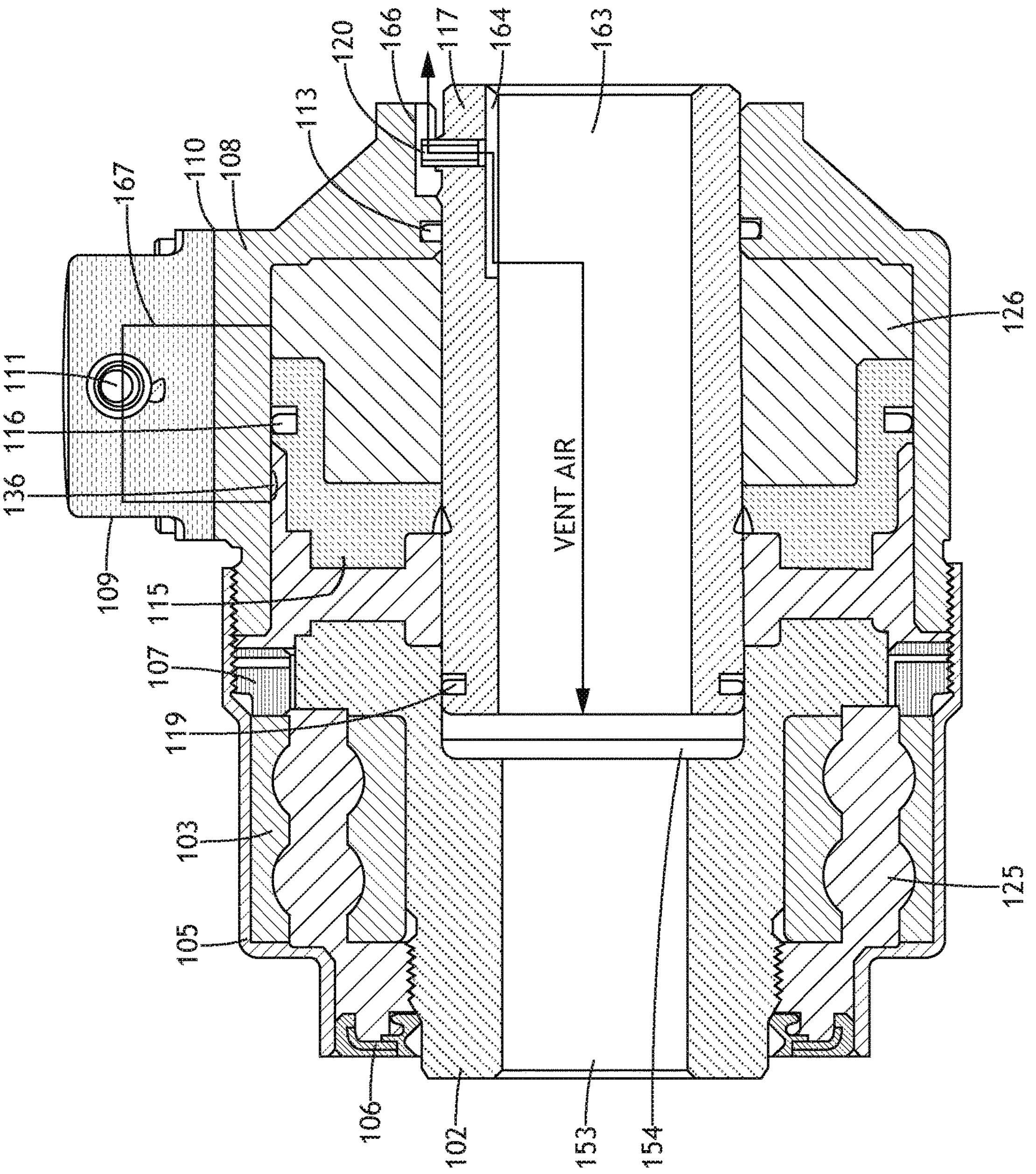
FIG. 1F illustrates a cross-sectional view of the hydromechanical disconnect along the center axis with the output hub in the disconnected position and with hydraulic fluid in advance and retract chambers connected through the manifold, in accordance with one or more embodiments of the present disclosure.
Figure 1G:
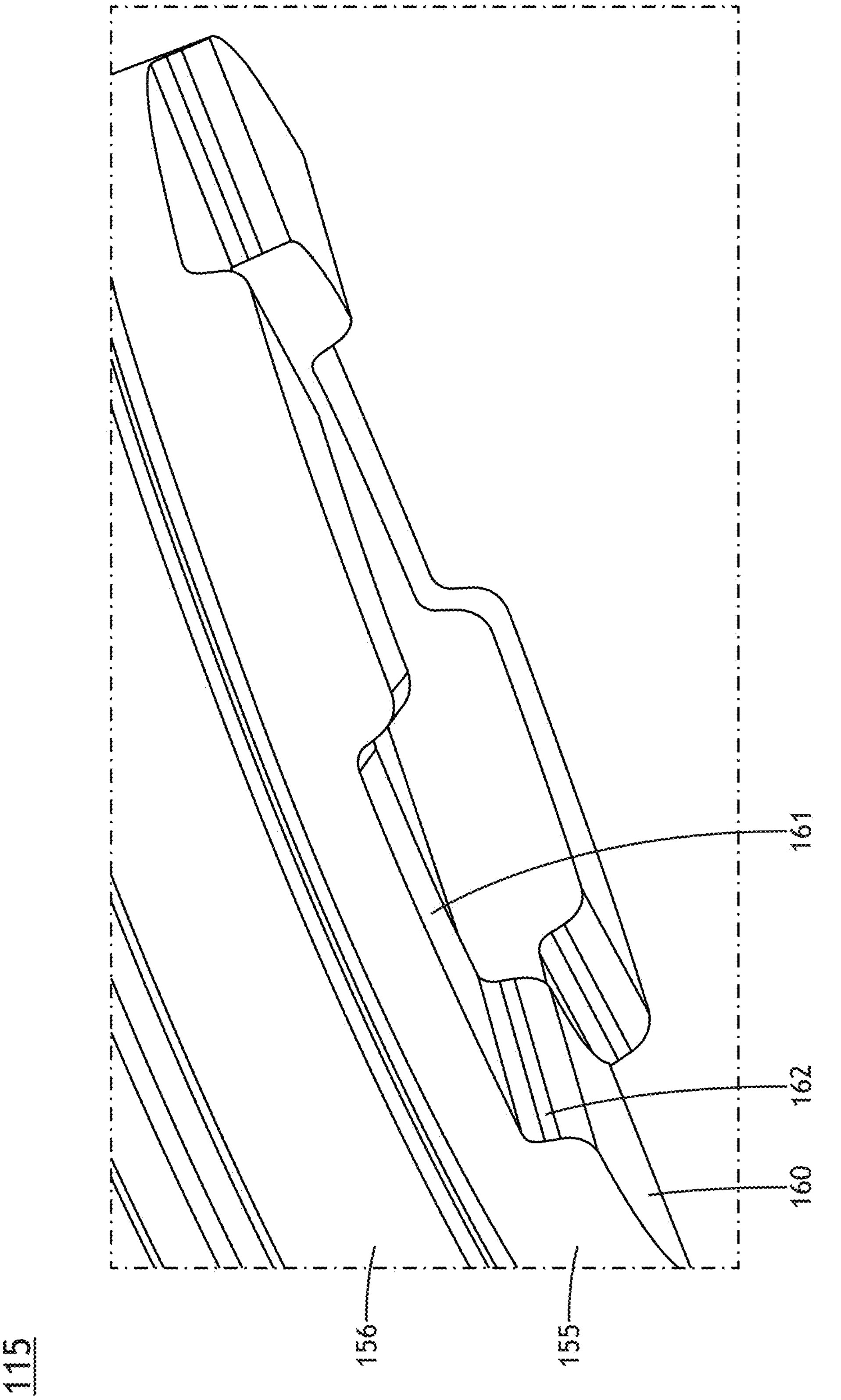
FIG. 1G illustrates a partial perspective view of the face-spline of the output hub, in accordance with one or more embodiments of the present disclosure.
Figure 1H:
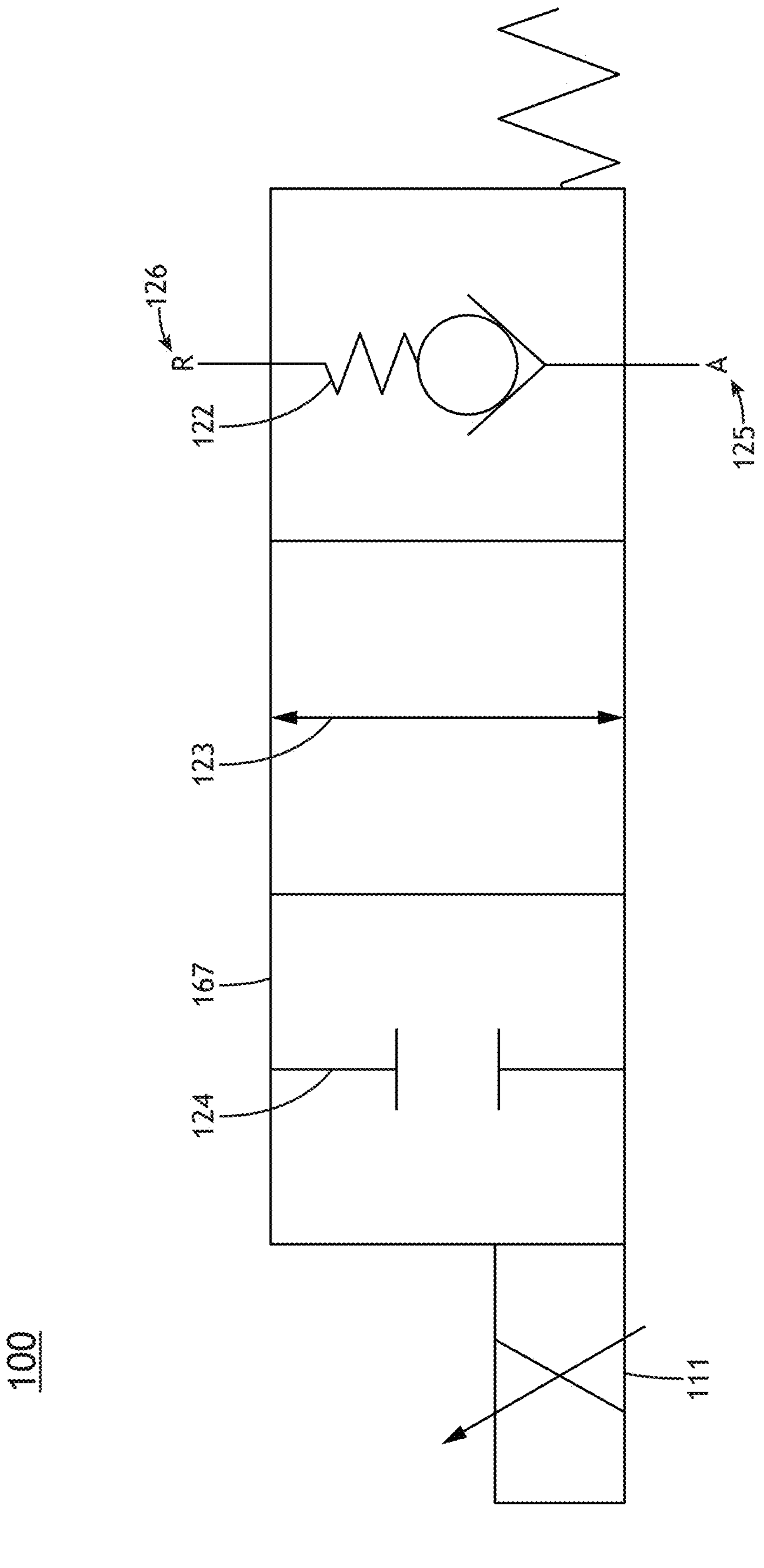
FIG. 1H illustrates a hydraulic schematic of the oil control valve configurable between a one-way mode, a passthrough mode, and a blocked mode, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a hydromechanical anti-roll bar disconnect. An anti-roll bar may include a hydromechanical disconnect. The hydromechanical disconnect may use windup torque as an actuating force to disconnect the hydromechanical disconnect. Hubs of the hydromechanical disconnect may be axially separated due to an axial separating force produced in face splines of the hubs. An oil control valve may control the disconnecting motion depending on the desired mode of the hydromechanical disconnect. The oil control valve controls the flow of fluid between advance and retract chambers defined by the hydromechanical disconnect. Flow from the advance chamber to the retract chamber may maintain the hydromechanical disconnect in a connected position. Flow between both the advance chamber and the retract chamber may allow translation of the hydromechanical disconnect between the non-rotatably connected position and a disconnected position. Flow blocked between the advance chamber and the retract chamber may maintain the hydromechanical disconnect in the disconnected position.

FIGS. 1A-1H illustrate a hydromechanical disconnect 100, in accordance with one or more embodiments of the present disclosure. The hydromechanical disconnect 100 may include a housing 101, an input hub 102, a bearing 103, an inner bearing nut 104, an input housing 105, a rotary seal 106, an outer bearing nut 107, an output housing 108, a manifold 109, a gasket 110, an oil control valve 111 (OCV), a sensor 112, a tube-to-housing seal 113, a return spring 114, an output hub 115, a hub-to-housing seal 116, an output tube 117, a hub-to-tube seal 119, pin 120, an advance chamber 125 ("A"), a retract chamber 126 ("R"), and the like.

The hydromechanical disconnect 100 may use both hydraulic and mechanical means to non-rotatably connect and disconnect the input hub 102 and the output hub 115, as described herein.

The input housing 105 may also be referred to as a seal housing. The input housing 105 may include one or more portions. For example, the input housing 105 may include the input-housing seal-portion 140, the input-housing radial-portion 141, the input-housing bearing-portion 142, and/or the input-housing threaded-portion 143. The input-housing seal-portion 140 may be disposed radially inwards of and axially offset from the input-housing radial-portion 141, the input-housing bearing-portion 142, and/or the input-housing threaded-portion 143. The input-housing seal-portion 140 and/or the input-housing bearing-portion 142 may extend axially from the input-housing radial-portion 141. The input-housing seal-portion 140 and the input-housing bearing-portion 142 may extend axially from the input-housing radial-portion 141 in opposing directions. The input-housing radial-portion 141 may extend radially between the input-housing seal-portion 140 and the input-housing bearing-portion 142. The input-housing threaded-portion 143 may extend axially from the input-housing bearing-portion 142. The input-housing bearing-portion 142 may be disposed axially between the input-housing radial-portion 141 and the input-housing threaded-portion 143.

The output housing 108 may include one or more portions. For example, the output housing 108 may include the output-housing tube-portion 144, the output-housing radial-portion 145, the output-housing hub-portion 146, the output-housing threaded-portion 147, and/or the output-housing keyway 166. The output-housing tube-portion 144 may be disposed radially inwards of and axially offset from the output-housing radial-portion 145, the output-housing hub-portion 146, and/or the output-housing threaded-portion 147. The output-housing tube-portion 144 and/or the output-housing hub-portion 146 may extend axially from the output-housing radial-portion 145. The output-housing tube-portion 144 and the output-housing hub-portion 146 may extend axially from the output-housing radial-portion 145 in opposing directions. The output-housing radial-portion 145 may extend radially between the output-housing tube-portion 144 and the output-housing hub-portion 146. The output-housing threaded-portion 147 may extend axially from the output-housing hub-portion 146. The output-housing hub-portion 146 may be disposed axially between the output-housing radial-portion 145 and the output-housing threaded-portion 147. The output-housing keyway 166 may be defined axially along a portion of the output-housing tube-portion 144.

The housing 101 may include the input housing 105 and the output housing 108. The input housing 105 and the output housing 108 may be affixed together. The input housing 105 and the output housing 108 may be affixed together by the input-housing threaded-portion 143 and the output-housing threaded-portion 147. The input-housing threaded-portion 143 and the output-housing threaded-portion 147 may be affixed by being meshed. The input-housing threaded-portion 143 and the output-housing threaded-portion 147 may also be affixed by a closure weld, pinning, thread-locker, and/or the like to prevent the mesh between the input-housing threaded-portion 143 and the output-housing threaded-portion 147 from loosening.

The housing 101 may house one or more components of the hydromechanical disconnect 100. For example, the housing 101 may house the input hub 102, the bearing 103, the inner bearing nut 104, the rotary seal 106, the outer bearing nut 107, the sensor 112, the tube-to-housing seal 113, the return spring 114, the output hub 115, the hub-to-housing seal 116, the output tube 117, the hub-to-tube seal 119, and the like. The housing 101 may house said components by said components being disposed radially inwards of and axially aligned with the housing 101. The housing 101 may house said components by the input housing 105 and/or the output housing 108. For example, the input housing 105 may house the input hub 102, the bearing 103, the inner bearing nut 104, the rotary seal 106, the outer bearing nut 107, a portion of the output tube 117, the hub-to-tube seal 119, and the like. By way of another example, the output housing 108 may house the sensor 112, the tube-to-housing seal 113, the return spring 114, the output hub 115, the hub-to-housing seal 116, a portion of the output tube 117, and the like.

The housing 101 may or may not house the manifold 109, the gasket 110, and/or the oil control valve 111. The manifold 109, the gasket 110, and/or the oil control valve 111 may be disposed radially outwards of and axially aligned with the housing 101. For example, the manifold 109, the gasket 110, and/or the oil control valve 111 may be disposed radially outwards of and axially aligned with the output housing 108 (e.g., the output-housing hub-portion 146).

The input hub 102 may include one or more portions. For example, the input hub 102 may include an input-hub seal-portion 148, an input-hub threaded-portion 149, an input-hub bearing-portion 150, an input-hub radial-portion 151, an input-hub face-spline 152, an input-hub through-hole 153, and/or an input-hub blind-hole 154. The input-hub seal-portion 148 and/or the input-hub bearing-portion 150 may be cylindrical. The input-hub threaded-portion 149 may be disposed axially between the input-hub seal-portion 148 and the input-hub bearing-portion 150. The input-hub bearing-portion 150 may be disposed axially between the input-hub threaded-portion 149 and the input-hub radial-portion 151. The input-hub radial-portion 151 may extend radially outwards from the input-hub bearing-portion 150. The input-hub face-spline 152 may extend axially from the input-hub radial-portion 151. The input-hub through-hole 153 and the input-hub blind-hole 154 may form a counter-bore hole along the center axis of the input hub 102. The input-hub blind-hole 154 may be disposed radially inwards of and axially aligned with the input-hub seal-portion 148, the input-hub threaded-portion 149, and/or the input-hub bearing-portion 150. The input-hub blind-hole 154 may be disposed radially inwards of and axially aligned with the input-hub radial-portion 151.

The output hub 115 may include one or more portions. For example, the output hub 115 may include an output-hub face-spline 155, an output-hub radial-portion 156, and/or an output-hub axial-portion 157. The output-hub face-spline 155 and/or the output-hub axial-portion 157 may extend axially from the output-hub radial-portion 156. The output-hub face-spline 155 and the output-hub axial-portion 157 may extend axially from the output-hub radial-portion 156 in opposing directions. The output-hub radial-portion 156 may extend radially inwards of the output-hub face-spline 155 and/or the output-hub axial-portion 157. An inner diameter of the output-hub radial-portion 156 may define a through-hole along the center axis of the output hub 115. An inner diameter of the output-hub axial-portion 157 may define a blind-hole along the center axis of the output hub 115 up to the output-hub radial-portion 156.

The output tube 117 may include one or more portions. For example, the output tube 117 may include an output-tube through-hole 163, an output-tube keyway 164, and/or an output-tube radial-hole 165. The output-tube through-hole 163 may define the inner diameter of the output tube 117 along the center axis of the output tube 117. The output-tube keyway 164 may be defined along a portion of the output-tube through-hole 163. The output-tube radial-hole 165 may be defined radially through the output tube 117 to the output-tube keyway 164.

The bearing 103 may be a radial bearing. The bearing 103 may include an inner race 158 and an outer race 159. The inner race 158 and the outer race 159 may rotate relative to each other about a center axis of the hydromechanical disconnect 100.

The input hub 102 and the housing 101 may be rotatably connected by which the input hub 102 may be configured to rotate relative to the housing 101 about the center axis of the hydromechanical disconnect 100. The bearing 103 may rotatably connect the input hub 102 and the housing 101. For example, the bearing 103 may rotatably connect the input hub 102 and the input housing 105. For instance, the bearing 103 may rotatably connect the input-hub bearing-portion 150 and the input-housing bearing-portion 142. The input hub 102 may be radially supported on the bearing 103. The inner race 158 of the bearing 103 may be disposed radially outwards of, axially aligned with, and affixed to the input-hub bearing-portion 150. For example, the inner race 158 may be pressed onto the input-hub bearing-portion 150. The outer race 159 may be disposed radially inwards of, axially aligned with, and affixed to the input-housing bearing-portion 142. For example, the outer race 159 may be pressed into the input-housing bearing-portion 142.

The housing 101, the input hub 102, the bearing 103, the inner bearing nut 104, the input housing 105, the rotary seal 106, the outer bearing nut 107, the output housing 108, the manifold 109, the gasket 110, the sensor 112, and/or the tube-to-housing seal 113 may be axially connected. In this regard, said components may not axially translate relative to each other.

The input hub 102 and the housing 101 may be axially connected and rotatably connected by a revolute joint. The revolute joint may allow the relative rotation while preventing axial translation of the input hub 102 relative to the housing 101. The revolute joint may be formed by the bearing 103, the inner bearing nut 104, and/or the outer bearing nut 107. The inner bearing nut 104 and the outer bearing nut 107 may axially connect the input hub 102 and the bearing 103 to the housing 101. The inner race 158 may be axially connected between the inner bearing nut 104 and the input hub 102 (e.g., the input-hub radial-portion 151). The outer race 159 may be axially connected between the input housing 105 (e.g., the input-housing radial-portion 141) and the outer bearing nut 107. The inner bearing nut 104 and the outer bearing nut 107 may be disposed radially outwards of, axially aligned with, and affixed to respective of the input hub 102 (e.g., the input-hub threaded-portion 149) and the input housing 105 (e.g., the input-housing threaded-portion 143). The inner bearing nut 104 and the outer bearing nut 107 may be disposed radially inwards of, axially aligned with, and radially separated with a clearance from respective of the input housing 105 (e.g., the input-housing seal-portion 140) and the input hub 102 (e.g., the input-hub radial-portion 151). The outer bearing nut 107 and the output housing 108 (e.g., the output-housing threaded-portion 147) may each be affixed to the input-housing threaded-portion 143. The outer bearing nut 107 may be disposed axially between the bearing 103 and the output housing 108. The input-housing threaded-portion 143 may allow the outer bearing nut 107 to capture the bearing 103.

The output hub 115, the hub-to-housing seal 116, the output tube 117, the hub-to-tube seal 119, and/or the pin 120 may be affixed. For example, the output-hub radial-portion 156 and an outer diameter of the output tube 117 may be affixed. The hub-to-housing seal 116 may be affixed to the output hub 115 (e.g., the output-hub axial-portion 157). The hub-to-tube seal 119 may be affixed to the output tube 117

(e.g., the outer diameter of the output tube 117). The pin 120 may be affixed to the output tube 117 (e.g., the output-tube radial-hole 165).

The output hub 115, the hub-to-housing seal 116, the output tube 117, the hub-to-tube seal 119, and/or the pin 120 may be non-rotatably connected to housing 101, the input housing 105, the rotary seal 106, the output housing 108, the manifold 109, the gasket 110, the tube-to-housing seal 113, and/or the outer race 159. The pin 120 may be an anti-rotation pin. The pin 120 may non-rotatably connect the output tube 117 (e.g., the output-tube radial-hole 165) and the output housing 108 (e.g., output-housing keyway 166). The pin 120 may be configured to axially translate along the output-housing keyway 166. For example, the pin 120 and the output-housing keyway 166 may form a prismatic joint.

The output hub 115, the hub-to-housing seal 116, the output tube 117, the hub-to-tube seal 119, and/or the pin 120 may be configured to axially translate relative to the housing 101, the input hub 102, the bearing 103, the inner bearing nut 104, the input housing 105, the rotary seal 106, the outer bearing nut 107, the output housing 108, the manifold 109, the gasket 110, the sensor 112, and/or the tube-to-housing seal 113. The output hub 115 may be configured to axially translate relative to the input hub 102 between a non-rotatably connected position and a disconnected position. The input hub 102 (e.g., the input-hub face-spline 152) and the output hub 115 (e.g., the output-hub face-spline 155) may be non-rotatably connected in the non-rotatably connected position. The input hub 102 and the output hub 115 may be disconnected and configured to rotate relative to each other in the disconnected position. Thus, the input hub 102 and the output hub 115 may be non-rotatably connected and disconnected based on the axial position of the output hub 115.

The input-hub face-spline 152 and/or the output-hub face-spline 155 may also be referred to as axial face splines. The input-hub face-spline 152 and/or the output-hub face-spline 155 may include the spline top-lands 160, the spline bottom-lands 161, and/or the spline teeth 162. The spline top-lands 160, the spline bottom-lands 161, and the spline teeth 162 may be disposed in a polar array about the center axis of the hydromechanical disconnect 100. The spline top-lands 160 may be axially offset from the spline bottom-lands 161. The spline teeth 162 may be circumferentially disposed between and axially connect the spline top-lands 160 and the spline bottom-lands 161. The output hub 115 may move axially with a select travel between the non-rotatably connected position and the disconnected position. For example, the travel may be about 4 mm, although this is not intended to be limiting. The travel may be defined as the axial offset between the spline top-lands 160 and the spline bottom-lands 161.

The input-hub face-spline 152 and the output-hub face-spline 155 may non-rotatably connect by the spline teeth 162 of the input-hub face-spline 152 meshing with the spline teeth 162 of the output-hub face-spline 155. The spline top-lands 160 and the spline bottom-lands 161 of the input-hub face-spline 152 may also abut respective of the spline bottom-lands 161 and the spline top-lands 160 when the input-hub face-spline 152 and the output-hub face-spline 155 are meshed, although such abutment may transfer no torque.

The spline top-lands 160 of the input-hub face-spline 152 and the output-hub face-spline 155 may abut when the input-hub face-spline 152 and the output-hub face-spline 155 are disconnected. The return spring 114 may axially translate the output hub 115 to maintain the abutment between the spline top-lands 160 of the input-hub face-spline 152 and the output-hub face-spline 155. The spline top-lands 160 of the output hub 115 may slide on the spline top-lands 160 of the input hub 102 when the output hub 115 rotates relative to the input hub 102 in the disconnected position.

The output hub 115 may disconnect from the input hub 102 due to torque between the input hub 102 and the output hub 115 and may reconnect under a low torque condition. The hydromechanical disconnect 100 may use the windup torque as the actuating force. Torque between the input-hub face-spline 152 of the input hub 102 and the output-hub face-spline 155 of the output hub 115 may cause axial motion of the output hub 115 relative to the input hub 102 (e.g., between the spline teeth 162). The spline teeth 162 may create the axial separating force, attempting to axially translate the output hub 115 away from the input hub 102. The axial separating force may be produced in the spline teeth 162 due to the flank angles of the spline teeth 162. The spline teeth 162 may include any suitable flank angle, such as, but not limited to, an S-shaped flank angle. The output hub 115 may disconnect from the input hub 102 when torque is applied in either direction (e.g., clockwise or counter-clockwise) by the spline bottom-lands 161 being circumferentially between pairs of the spline teeth 162.

The return spring 114 may return the output hub 115 to be non-rotatably connected with the input hub 102. The input hub 102 and the output hub 115 may be normally non-rotatably connected. The input hub 102 and the output hub 115 may be normally non-rotatably connected by the return spring 114. The return spring 114 may be disposed in one of the advance chamber 125 or the retract chamber 126. For example, the return spring 114 may be disposed in the retract chamber 126. The return spring 114 may act axially against the output hub 115. The return spring 114 may be coupled between the output hub 115 (e.g., the output-hub radial-portion 156) and the output housing 108 (e.g., the output-housing radial-portion 145). The return spring 114 may be a compression spring. The return spring 114 may exhibit an axial force attempting to resist compression forcing the output hub 115 axially towards the output housing 108 and keeping the input hub 102 and the output hub 115 normally non-rotatably connected. The axial translation of the output hub 115 away from the input hub 102 due to the torque between the input hub 102 and the output hub 115 may overcome the axial force of the return spring 114 and further compress the return spring 114, forcing the output hub 115 into the disconnected position. The return spring 114 may also maintain the abutment between the spline top-lands 160 in the disconnected position. When the torque is reduced, the return spring 114 may cause the output hub 115 to translate towards the input hub 102 into the non-rotatably connected position. In this regard, the return spring 114 may also be considered a hub-return spring.

The housing 101 and the input hub 102 may be sealed together. For example, the input housing 105 and the input hub 102 may be sealed together. The rotary seal 106 may dynamically seal the input hub 102 (e.g., the input-hub seal-portion 148) to the input housing 105 (e.g., the input-housing seal-portion 140). The rotary seal 106 may allow the input hub 102 to rotate relative to the input housing 105 while maintaining the seal. The rotary seal 106 may include any suitable rotary seal, such as, but not limited to, a spring-loaded rotary seal. The inner bearing nut 104 may be disposed axially between the rotary seal 106 and the bearing 103.

The housing 101 and the output hub 115 may be sealed together. For example, the output housing 108 and the output hub 115 may be sealed together. The output hub 115 may carry the hub-to-housing seal 116 with the axial translation of the output hub 115. The hub-to-housing seal 116 may seal the output hub 115 (e.g., the output-hub axial-portion 157) to the output housing 108 (e.g., the output-housing hub-portion 146). The hub-to-housing seal 116 may allow the output hub 115 to axially translate relative to the output housing 108 while maintaining the seal.

The input hub 102 and the output tube 117 may be sealed together. The output tube 117 may carry the hub-to-tube seal 119 with the axial translation of the output tube 117. The hub-to-housing seal 116 may seal the output tube 117 (e.g., the outer diameter of the output tube 117) to the input hub 102 (e.g., the input-hub blind-hole 154). The hub-to-tube seal 119 may allow the output tube 117 to axially translate relative to the input hub 102 and/or may allow the input hub 102 to rotate relative to the output tube 117 while maintaining the seal between the output tube 117 and the input hub 102.

The housing 101 and the output tube 117 may be sealed together. For example, the output housing 108 and the output tube 117 may be sealed together. The output housing 108 may carry the tube-to-housing seal 113. The tube-to-housing seal 113 may seal the output tube 117 (e.g., the outer diameter of the output tube 117) to the output housing 108. The tube-to-housing seal 113 may allow the output tube 117 to axially translate relative to the output housing 108 while maintaining the seal. The tube-to-housing seal 113 may be disposed axially between the output hub 115 and the pin 120.

The advance chamber 125 and the retract chamber 126 may be defined by one or more components of the hydromechanical disconnect 100. The advance chamber 125 may be defined by the housing 101, input hub 102, the input housing 105, the rotary seal 106, the output housing 108, the output hub 115, the hub-to-housing seal 116, the output tube 117, and the hub-to-tube seal 119. The retract chamber 126 may be defined by output housing 108, the tube-to-housing seal 113, the output hub 115, the hub-to-housing seal 116, and the output tube 117. The rotary seal 106 and the tube-to-housing seal 113 may seal respective of the advance chamber 125 and the retract chamber 126 from the atmosphere. The hub-to-housing seal 116 may seal the advance chamber 125 and the retract chamber 126 from each other. The output hub 115 and the hub-to-housing seal 116 may separate the advance chamber 125 from the retract chamber 126. The hub-to-tube seal 119 may seal the advance chamber 125 from the input-hub blind-hole 154 and/or the output-tube through-hole 163.

The advance chamber 125 and the retract chamber 126 may hold the hydraulic fluid 167. The hydraulic fluid 167 may be incompressible. For example, the hydraulic fluid 167 may be oil or the like. The advance chamber 125 may allow the axial advancement of the output hub 115 to the disconnected position by receiving the hydraulic fluid 167 from the retract chamber 126. The retract chamber 126 may allow the axial retraction of the of the output hub 115 to the non-rotatably connected position by receiving the hydraulic fluid 167 from the advance chamber 125.

The manifold 109 may fluidically couple the hydraulic fluid 167 between the advance chamber 125 and the retract chamber 126. The advance chamber 125 and the retract chamber 126 may be fluidically connected to the manifold 109. The manifold 109 may define a manifold retract port 135 and a manifold advance port 136. For example, the advance chamber 125 and the retract chamber 126 may be fluidically connected to respective of the manifold advance port 136 and the manifold retract port 135. The gasket 110 may seal the manifold 109 to the housing 101. The output hub 115 may act as a piston for the hydraulic fluid 167 in the advance chamber 125 and the retract chamber 126. The output hub 115 may attempt to force the hydraulic fluid 167 to flow from the advance chamber 125 through the manifold 109 to the retract chamber 126 when axially translating towards the advance chamber 125 (e.g., towards the input hub 102; from the disconnected position to the non-rotatably connected position). Similarly, the output hub 115 may attempt to force the hydraulic fluid 167 to flow from the retract chamber 126 through the manifold 109 to the advance chamber 125 when axially translating towards the retract chamber 126 (e.g., away from the input hub 102; from the non-rotatably connected position to the disconnected position). The manifold retract port 135 and the manifold advance port 136 may extend through the output housing 108. The manifold retract port 135 and the manifold advance port 136 may be uncovered by the output hub 115 (e.g., uncovered in both the non-rotatably connected position and the disconnected position).

The oil control valve 111 may be housed by the manifold 109. The oil control valve 111 may control the flow of the hydraulic fluid 167 through the manifold 109 between the advance chamber 125 and the retract chamber 126, thereby controlling the axial motion of the output hub 115 relative to the input hub 102. The axial motion may be allowed/disallowed by the oil control valve 111 depending on the desired state of the hydromechanical disconnect 100. The oil control valve 111 may be a three-position valve. The oil control valve 111 may be configurable between a one-way mode 122, a passthrough mode 123, and/or a blocked mode 124. The modes may also be referred to as states. The oil control valve 111 may control the flow of the hydraulic fluid 167 through the manifold 109 between the advance chamber 125 and the retract chamber 126 based on the mode of the oil control valve 111.

The one-way mode 122 may also be referred to as a normal mode, a non-rotatably connected mode, or the like. The one-way mode 122 may be the default condition with power off to the oil control valve 111. In the one-way mode 122, the oil control valve 111 may allow the flow of the hydraulic fluid 167 from the advance chamber 125 to the retract chamber 126 and may block the flow of the hydraulic fluid 167 from the retract chamber 126 to the advance chamber 125 (e.g., A→R). The output hub 115 may axially translate towards the input hub 102 and may be blocked from axially translated away from the input hub 102 when the oil control valve 111 is configured in the one-way mode 122. Allowing the flow of the hydraulic fluid 167 from the advance chamber 125 to the retract chamber 126 may allow the output hub 115 to axially translate towards the input hub 102 (e.g., in the event the output hub 115 is not fully at the non-rotatably connected position). Blocking the flow of the hydraulic fluid 167 from the retract chamber 126 to the advance chamber 125 may prevent the output hub from axially translating away from the input hub. Blocking the flow of the hydraulic fluid 167 in the retract chamber 126 causes the hydraulic fluid 167 in the retract chamber 126 to act as a hydraulic lock, preventing the axial motion of the output hub 115 away from the input hub 102. The output hub 115 may tend towards the non-rotatably connected position under the force of the return spring 114 if there is low enough torque windup if the oil control valve 111 is in the one-way mode 122. The output hub 115 may remain non-rotatably connected to the input hub 102 even where the torque between the input hub 102 and the output hub 115 experience sufficient torque to overcome the return spring 114.

The passthrough mode 123 may also be referred to as a two-way mode. In the passthrough mode 123, the oil control valve 111 may allow the flow of the hydraulic fluid 167 between the advance chamber 125 and the retract chamber 126 in both directions (e.g., A⇔R). The output hub 115 may axially translate towards and away from the input hub 102 when the oil control valve 111 is configured in the passthrough mode. Allowing the flow of the hydraulic fluid 167 between the advance chamber 125 and the retract chamber 126 in both directions may allow the output hub 115 to axially translate both towards and away from the input hub 102. When the torque is sufficient to overcome the return spring 114 and drag forces, the output hub 115 may advance to the disconnected position. Conversely if the torque reduces such that the returning force of the return spring 114 is greater, the output hub 115 may tend to retract back to the non-rotatably connected position.

The blocked mode 124 may also be referred to as a no-flow mode. In the blocked mode 124, the oil control valve 111 may block the flow of the hydraulic fluid 167 in either direction between the advance chamber 125 and the retract chamber 126 (e.g., A⇔R). The output hub 115 may be blocked from axially translating towards and away from the input hub 102 when the oil control valve 111 is configured in the blocked mode 124. Blocking the flow of the hydraulic fluid 167 between the advance chamber 125 and the retract chamber 126 in both directions may block the output hub 115 from axially translating both towards and away from the input hub 102. The oil control valve 111 may be configured in the blocked mode 124 when the output hub 115 is in the disconnected position. The blocked mode 124 may axially maintain the output hub 115 in the disconnected position by maintaining the hydraulic fluid 167 in each of the advance chamber 125 and the retract chamber 126, while permitting the input hub 102 and the output hub 115 to rotate relative to each other. The output hub 115 may be rotated such that the spline teeth 162 of the input-hub face-spline 152 and the output-hub face-spline 155 are circumferentially aligned but are axially offset due to the output hub 115 being axially maintained at the disconnected position.

The sensor 112 may detect the output hub 115 (e.g., the output-hub axial-portion 157). The sensor 112 may include any suitable sensor for detecting the output hub 115, such as, but not limited to, a limit switch sensor, a proximity sensor, or the like. The sensor 112 may be affixed to the output housing 108 (e.g., the output-housing hub-portion 146). The sensor 112 may detect the output hub 115 at the disconnected position. The output-hub axial-portion 157 may be axially aligned with and disposed radially inwards of the sensor 112 at the disconnected position and may be axially offset from the sensor 112 at the non-rotatably connected position to allow detecting the output hub 115 at the disconnected position and not the non-rotatably connected position. The sensor 112 may control the oil control valve 111 by detecting the output hub 115. The sensor 112 may cause the oil control valve 111 to be configured in blocked mode 124 in response to the sensor 112 detecting the output hub 115 at the disconnected position. For example, when the output hub 115 has advanced to where the output hub 115 is detected by the sensor 112 (e.g., the disconnected position), the sensor 112 may cause the oil control valve 111 to switch to the blocked mode 124 to keep the output hub 115 held axially in the disconnected position. Thus, the oil control valve 111 may be prevented from blocking the flow of the hydraulic fluid 167 until the input hub 102 and the output hub 115 are disconnected.

The output housing 108 (e.g., the output-housing keyway 166), the output tube 117 (e.g., the output-tube keyway 164), and/or the pin 120 may balance air pressure within the input hub 102 (e.g., the input-hub through-hole 153, the input-hub blind-hole 154) and/or the output tube 117 (e.g., the output-tube through-hole 163) with atmospheric pressure. The pin 120 may be hollow. For example, the pin 120 may define a through-hole along the center axis of the pin 120. The pin 120 may fluidically couple the output tube 117 (e.g., the output-tube through-hole 163) and the output housing 108 (output-housing keyway 166). The pin 120 may also fluidically couple the input-hub blind-hole 154 and the output housing 108. The pin 120 may fluidically couple the input-hub blind-hole 154 and the output-housing keyway 166 through the output-tube through-hole 163, the output-tube keyway 164, the output-tube radial-hole 165, and the hollow center of the pin 120. The output-tube keyway 164 may also fluidically couple to atmosphere. The fluidic coupling may be beneficial to balance the vacuum pressure in the input-hub blind-hole 154 to atmosphere when the output hub 115 axially translates relative to the input hub 102 and an axial end of the output-tube through-hole 163 adjacent to the pin 120 is capped (e.g., capped by an output rollbar 302).

Figure 2A:
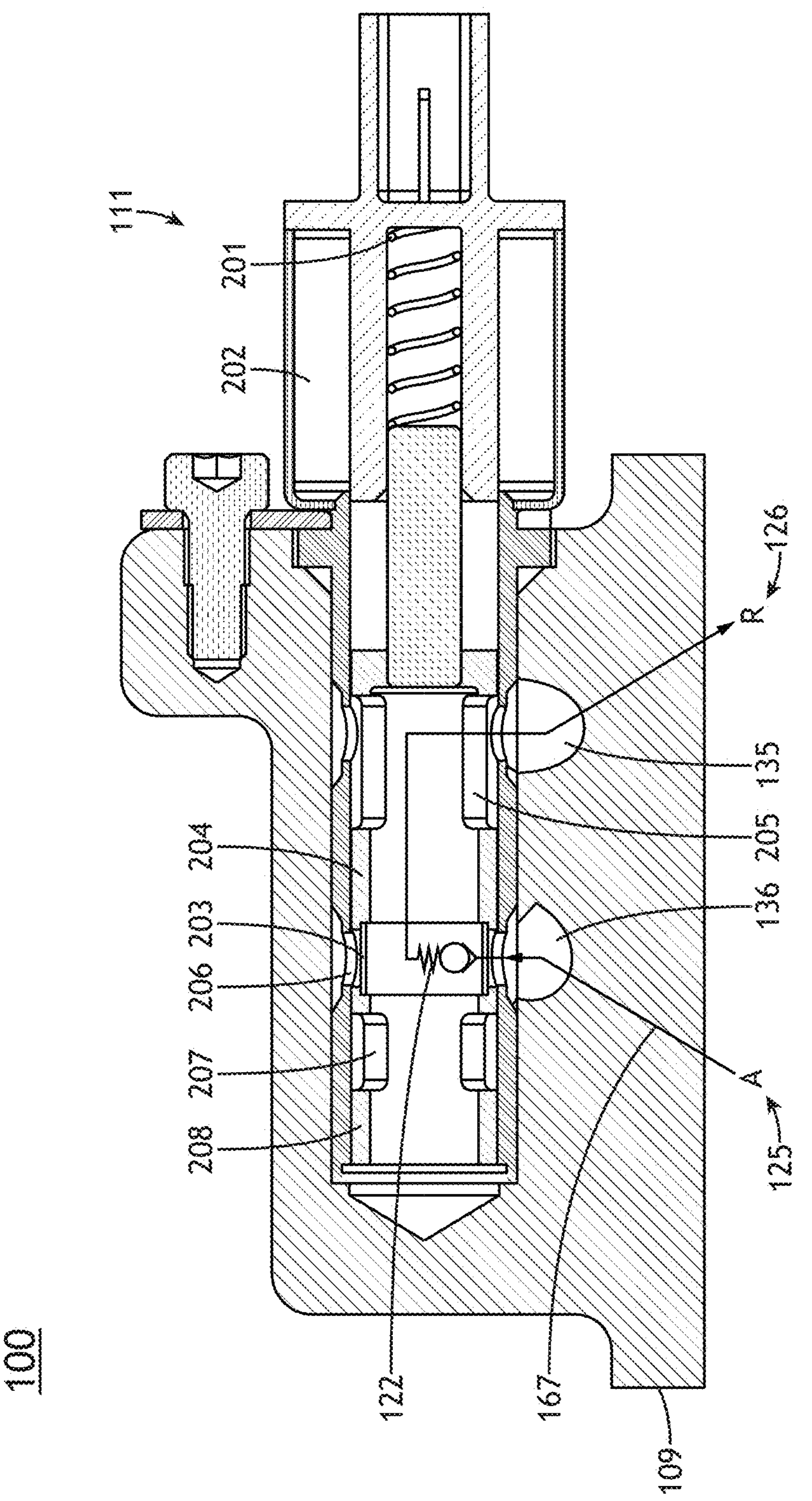
FIG. 2A illustrates a cross-sectional view of the oil control valve and manifold of the hydromechanical disconnect configured in the one-way mode, in accordance with one or more embodiments of the present disclosure.
Figure 2B:
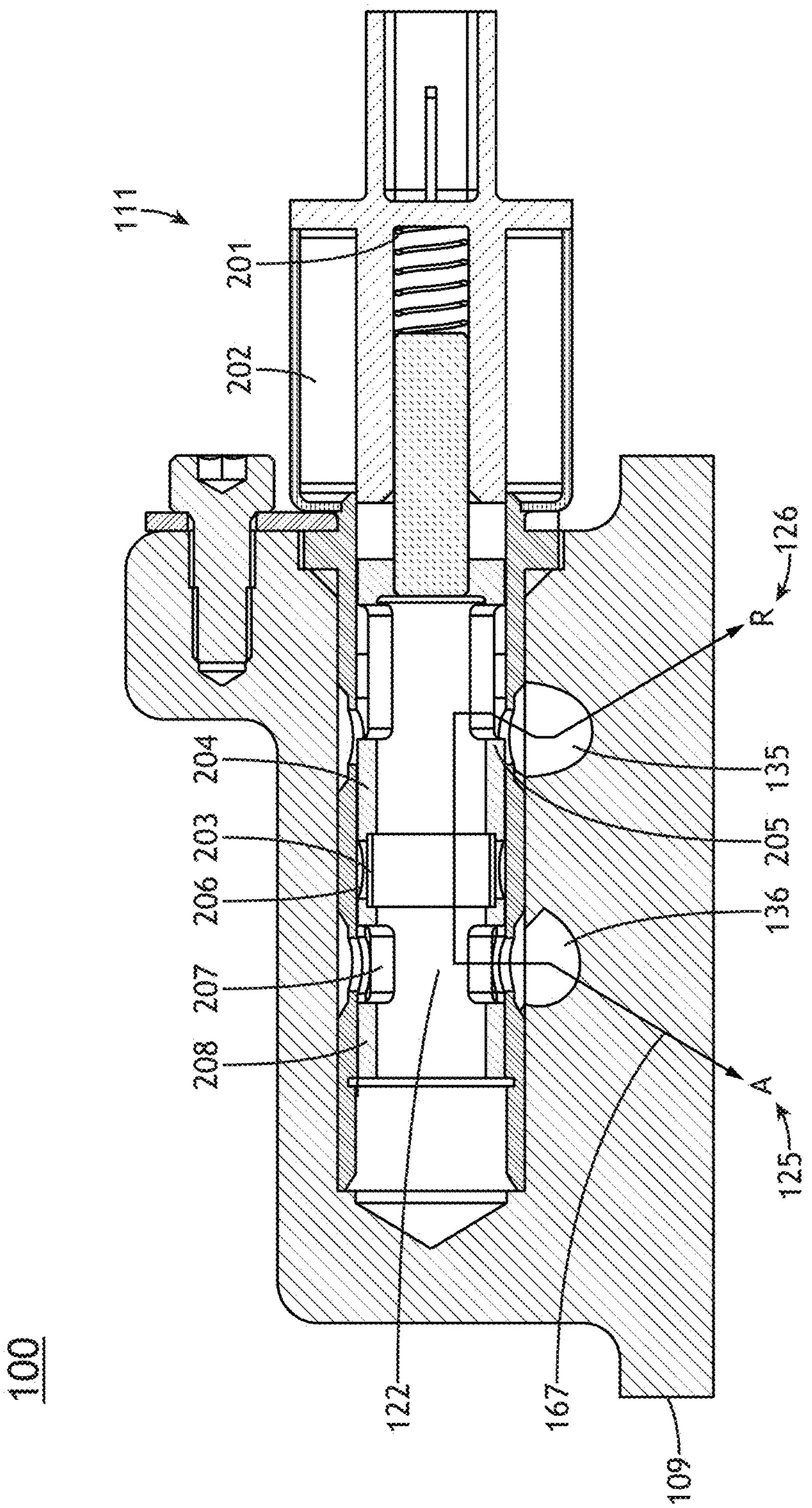
FIG. 2B illustrates a cross-sectional view of the oil control valve and manifold configured in the passthrough mode, in accordance with one or more embodiments of the present disclosure.
Figure 2C:
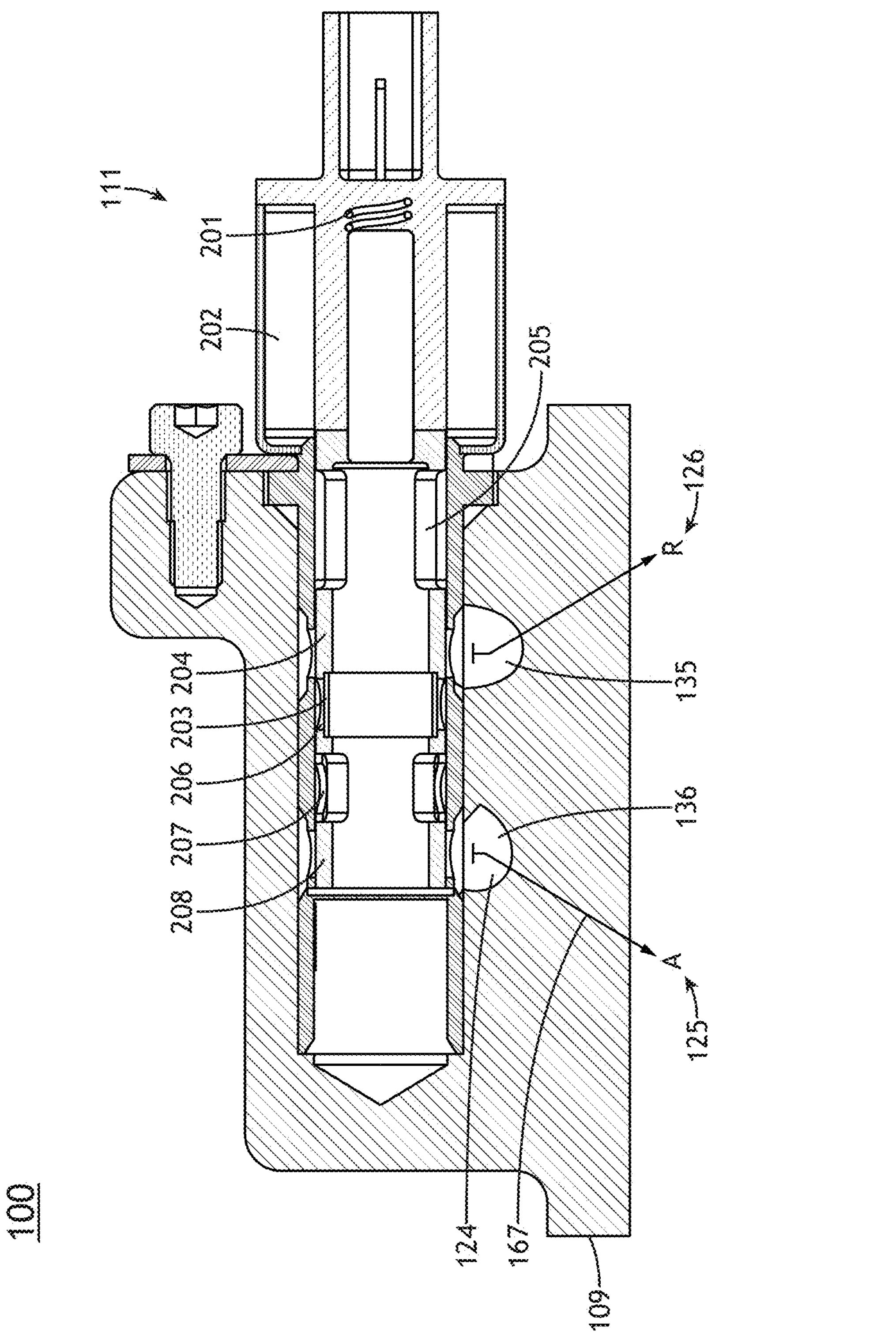
FIG. 2C illustrates a cross-sectional view of the oil control valve and manifold configured in the blocked mode, in accordance with one or more embodiments of the present disclosure.
Figure 3A:
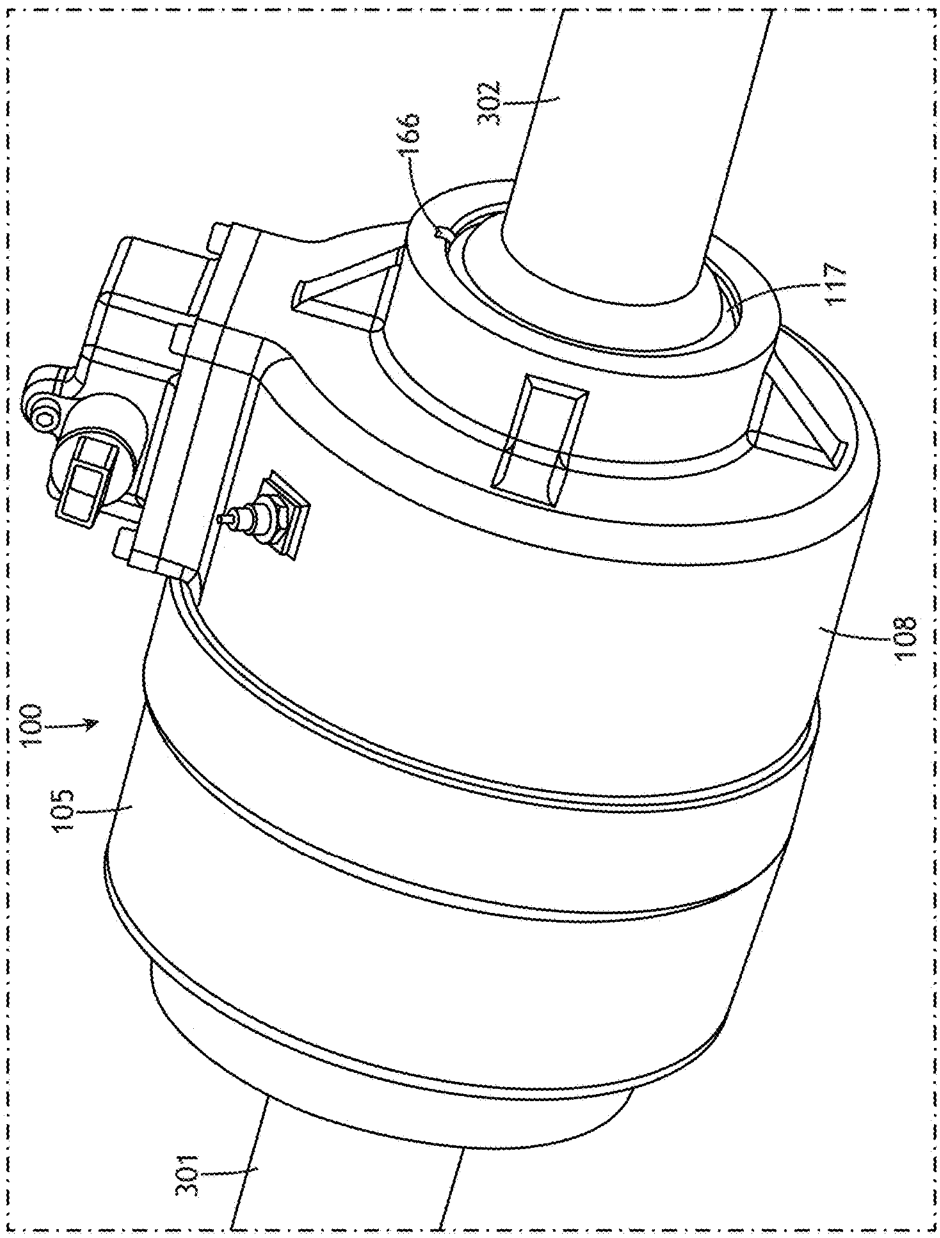
FIG. 3A-3B illustrate partial perspective views of an anti-roll bar with the hydromechanical disconnect, in accordance with one or more embodiments of the present disclosure.
Figure 3B:
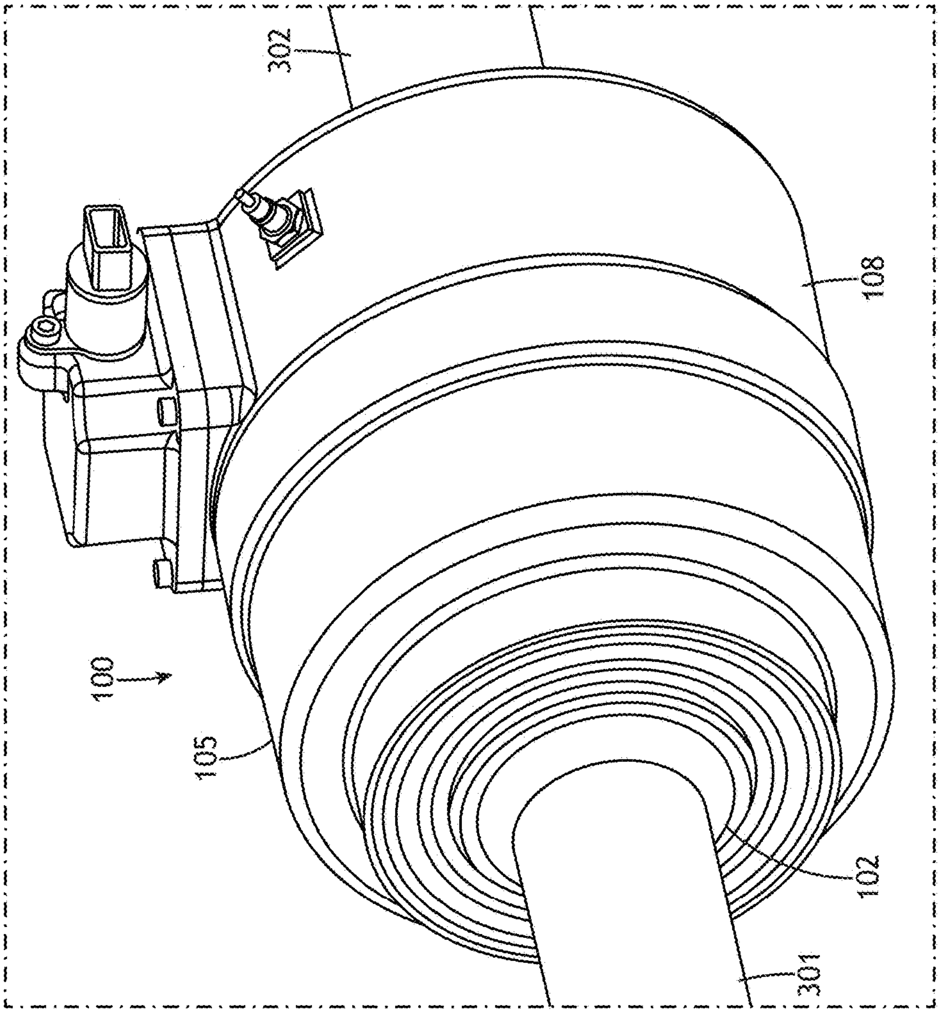
Figure 3C:
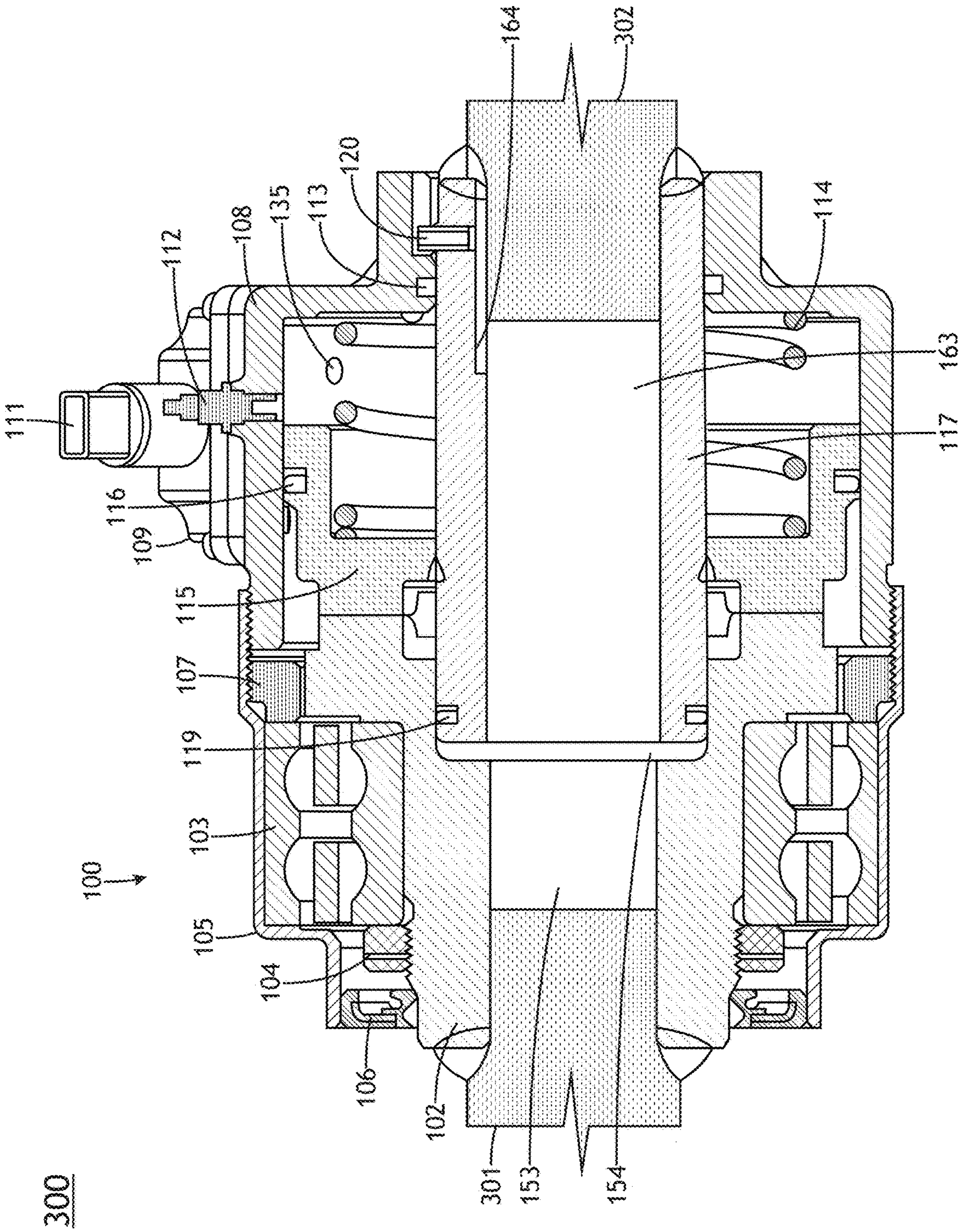
FIG. 3C illustrates a partial cross-sectional view of the anti-roll bar along the center axis with the output hub in the non-rotatably connected position relative to the input hub, in accordance with one or more embodiments of the present disclosure.
Figure 3D:
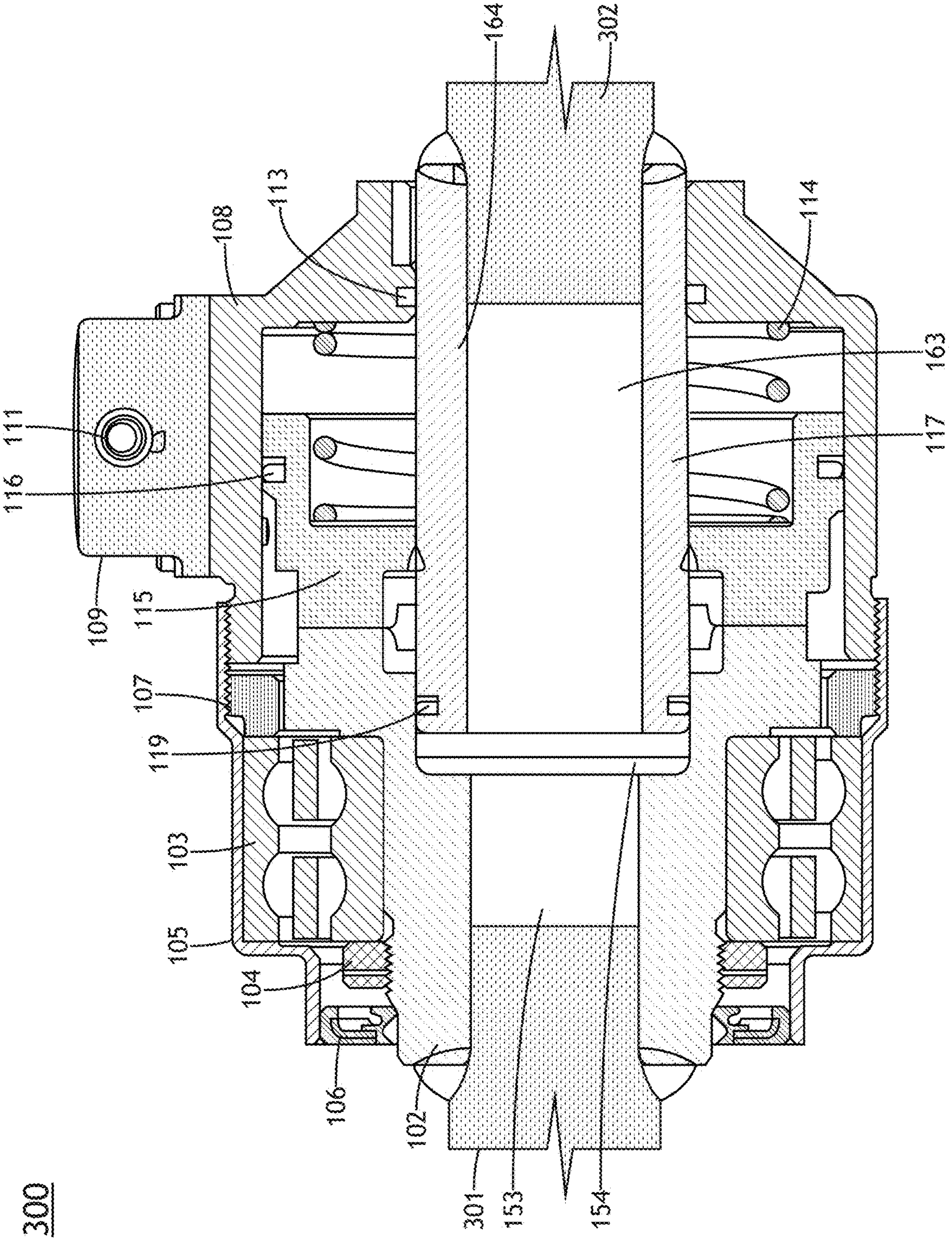
FIG. 3D illustrates a partial cross-sectional view of the anti-roll bar along the center axis with the output hub in the disconnected position relative to the input hub, in accordance with one or more embodiments of the present disclosure.

FIGS. 2A-2C illustrate an example of the oil control valve 111 housed in the manifold 109, in accordance with one or more embodiments of the present disclosure. The oil control valve 111 may include one or more components, by which the oil control valve 111 may be configured between the one-way mode 122, the passthrough mode 123, and the blocked mode 124. For example, the oil control valve 111 may include a valve spring 201, a valve actuator 202, a valve ring 203, a valve poppet 204, and the like. The valve poppet 204 may define a valve-poppet retract port 205, a valve-poppet one-way-mode advance port 206, a valve-poppet passthrough-mode advance port 207, and a valve-poppet blocked-mode wall 208.

The oil control valve 111 may translate the valve poppet 204 to configure the oil control valve 111 in the one-way mode 122, the passthrough mode 123, and the blocked mode 124. The oil control valve 111 may be powered to the passthrough mode 123 and/or the blocked mode 124. The valve actuator 202 may be the powered components of the oil control valve 111. The valve actuator 202 may be a two-stage actuator which may be actuated to the passthrough mode 123 or the blocked mode 124 when the valve actuator 202 is powered. For example, the valve actuator 202 may be a proportional solenoid, or the like. The oil control valve 111 may be spring-loaded to the one-way mode 122 when the oil control valve 111 is powered off. The valve spring 201 may spring-load the oil control valve 111. For example, the valve spring 201 may couple between the valve actuator 202 and the valve poppet 204.

The manifold retract port 135 and the valve-poppet retract port 205 may be axially aligned when the oil control valve 111 is configured in the one-way mode 122 and/or the passthrough mode 123. The manifold retract port 135 and the valve-poppet retract port 205 may fluidically couple the hydraulic fluid 167 from the retract chamber 126 into the valve poppet 204. The valve-poppet retract port 205 may be axially offset from the manifold retract port 135 when the oil control valve 111 is configured in the blocked mode 124.

The translation of the valve poppet 204 may axially align the manifold advance port 136 with the valve-poppet one-way-mode advance port 206 and the valve ring 203 when the oil control valve 111 is configured in the one-way mode 122, the valve-poppet passthrough-mode advance port 207 when the oil control valve 111 is configured in the passthrough mode 123, and/or the valve-poppet blocked-mode wall 208 when the oil control valve 111 is configured in the blocked mode 124. The valve-poppet passthrough-mode advance port 207 may be disposed between the valve-poppet one-way-mode advance port 206 and the valve-poppet blocked-mode wall 208.

In the one-way mode 122, the valve ring 203 may constrict radially inwards to uncover the valve-poppet one-way-mode advance port 206 allowing the flow of the hydraulic fluid 167 from the advance chamber 125 through the manifold advance port 136, the valve-poppet one-way-mode advance port 206, the valve-poppet retract port 205, and the manifold retract port 135 to the retract chamber 126. Similarly, the valve ring 203 may expand radially outwards to cover the valve-poppet one-way-mode advance port 206 blocking the flow of the hydraulic fluid 167 from the retract chamber 126 through the manifold retract port 135 and the valve-poppet retract port 205 to the valve-poppet one-way-mode advance port 206. Thus, the valve ring 203 and the valve-poppet one-way-mode advance port 206 may form a one-way valve.

In the passthrough mode 123, the hydraulic fluid 167 may flow bidirectionally between the advance chamber 125 through the manifold advance port 136, the valve-poppet one-way-mode advance port 206, the valve-poppet retract port 205, and the manifold retract port 135 to the retract chamber 126.

In the blocked mode 124, the hydraulic fluid 167 may be blocked from flowing between the manifold advance port 136 and the manifold retract port 135 by the valve-poppet blocked-mode wall 208 covering the manifold retract port 135.

FIGS. 3A-3D illustrate an anti-roll bar 300, in accordance with one or more embodiments of the present disclosure. The anti-roll bar 300 may also be referred to as a roll bar, an anti-sway bar, a sway bar, a stabilizer bar, or the like. The anti-roll bar 300 may include the hydromechanical disconnect 100. The anti-roll bar 300 may include one or more additional components, such as, but not limited to, an input rollbar 301 and/or an output rollbar 302.

The input rollbar 301 and the output rollbar 302 may be affixed to respective of the input hub 102 (e.g., the input-hub through-hole 153) and the output tube 117 (e.g., the output-tube through-hole 163). The face-splines in combination with the oil control valve 111 may allow the hydromechanical disconnect 100 to non-rotatably connect and disconnect the input rollbar 301 and the output rollbar 302. The input rollbar 301 and the output rollbar 302 may be non-rotatably connected through the input hub 102, the output hub 115, and the output tube 117 when the input hub 102 and the output hub 115 are non-rotatably connected and the oil control valve 111 is configured in the normal mode. The input rollbar 301 and the output rollbar 302 may be wound-up (e.g., torque applied) to disconnect the output hub 115 from the input hub 102 in combination with the oil control valve 111 being configured in the passthrough mode 123. The hydromechanical disconnect 100 may then lock the disconnection between the input rollbar 301 and the output rollbar 302 by being configured in the blocked mode 124. The output rollbar 302 may rotate with respect to the input rollbar 301 when the output hub 115 is disconnected from the input hub 102.

The hub-to-tube seal 119, the input-hub through-hole 153, the input-hub blind-hole 154, the output-tube through-hole 163, the input rollbar 301, and the output rollbar 302 may define a chamber. For example, the input rollbar 301 and the output rollbar 302 may cap the axial ends of respective of the input-hub through-hole 153 and the output-tube through-hole 163. The output housing 108, the output tube 117, and the pin 120 may be configured to vent the chamber as the output hub 115, the output tube 117, and the output rollbar 302 move axially with respect to the input hub 102 and the input rollbar 301. For example, the output-housing keyway 166, the output-tube keyway 164, and the pin 120 may vent the chamber. An axial end of the output-tube keyway 164 may be axially offset from the output rollbar 302. The output rollbar 302 may uncover the output-housing keyway 166.

Referring generally again to the figures. The use of the terms input and output is not intended to be limiting. For example, the input hub 102 and/or the output hub 115 may receive a torque input with the other of the input hub 102 or the output hub 115 outputting the torque when connected. The input hub 102 may be considered the input by being radially supported by the bearing 103.

The modes of the oil control valve 111 may be controlled using the following logic. When a disconnect is requested, the oil control valve 111 changes to the passthrough mode 123 and thus forward and reverse axial motion is allowed. When the sensor 112 detects the output hub 115, the oil control valve 111 changes to the blocked mode 124 and thus axial motion is prevented. When a reconnect is desired, power may be removed from the oil control valve 111 and thus the face-splines may reconnect under the return spring 114 if there is geometric clearance to allow the spline curves to connect (the reconnect occurs once the windup is removed to within a few degrees).

The anti-roll bar 300 may be used in a vehicle suspension. The anti-roll bar 300 may be a front bar and/or a rear bar. The input rollbar 301 and the output rollbar 302 may be affixed to respective control arms of the vehicle suspension. Movement of the control arms up and down with movement of the vehicle suspension may twist the input rollbar 301 and the output rollbar 302, causing the windup. The hydromechanical disconnect 100 may be beneficial to normally connect the input rollbar 301 and the output rollbar 302 while allowing to disconnect the input rollbar 301 and the output rollbar 302. The hydromechanical disconnect 100 may disconnect the input rollbar 301 and the output rollbar 302 by powering the oil control valve 111 in off-roading conditions where additional wheel articulation is desirable. When transitioning back to normal road conditions, the oil control valve 111 may be unpowered to connect the input rollbar 301 and the output rollbar 302.

The input rollbar 301 and the output rollbar 302 may be disconnected to provide additional articulation between the input rollbar 301 and the output rollbar 302. For example, the output rollbar 302 may articulate by from +9° to −25° relative to the input rollbar 301 when the input rollbar 301 and the output rollbar 302 are disconnected, although this is not intended to be limiting. The specific angle may be based on the geometry of the vehicle suspension.

Radial bearings may refer to any bearing which may bear a radial load. Similarly, thrust bearings may refer to any bearing which may bear an axial load. The radial bearings and/or the thrust bearings may include plain bearings (e.g., bushings), ball bearings, roller bearings, or the like.

A "non-rotatable connection" and derivatives thereof, such as "non-rotatably connected," between first and second components may mean that the first component is connected to the second component so that any time the first component rotates, the second component rotates with the first component, and any time the second component rotates, the first component rotates with the second component. A non-rotatable connection may transmit torque between the first and second components. Axial displacement between the first and second components is possible. For example, the non-rotatable connection may be a prismatic joint permitting relative axial translation.

A "rotatable connection" and derivatives thereof, such as "rotatably connected," between first and second components may mean that the first component is connected to the second component so that the first component may rotate relative to the second component, and the second component may rotate relative to the first component. A rotatable connection may not transmit torque between the first and second components. Axial displacement between the first and second components is possible. For example, the rotatable connection may be a cylindrical joint permitting relative rotation and relative axial translation. By way of another example, the rotatable connection may be a revolute joint permitting relative rotation but not permitting relative axial translation.

An "axial connection" and derivatives thereof, such as "axially connected," between first and second components may mean that the first component is connected to the second component so that any time the first component axially translates, the second component axially translates with the first component, and any time the second component axially translates, the first component axially translates with the second component. Rotation between the first and second components may or may not be possible. For example, the axial connection may be a revolute joint permitting relative rotation or an affixed joint not permitting the relative rotation.

A prismatic joint may be a one-degree-of-freedom joint. The prismatic joint between a first component and a second component may permit the first component to axially translate relative to the second component, and vice versa, but may permit no other relative translation or relative rotation therebetween. The prismatic joint may include any suitable prismatic joint, such as, but not limited to, a polygonal joint (e.g., a square joint, a hexagonal joint), a stadium joint, a D-joint, a keyed joint, a floating spline joint, a dovetail slide, a linear bearing, or the like.

A revolute joint may be a one-degree-of-freedom joint. The revolute joint between a first component and a second component may permit the first component to rotate relative to the second component, and vice versa, but may permit no relative translation therebetween.

A cylindrical joint may be a two-degree-of-freedom joint. The cylindrical joint between a first component and a second component may permit the first component to rotate relative to the second component and may permit the first component to axially translate relative to the second component, and vice versa.

The term "axial" and derivatives thereof, such as "axially," shall be understood to refer to a direction along the axis of a rotor shaft configured to rotate about the axis in operation of the apparatus described herein. Further, the term "radial" and derivatives thereof, such as "radially," shall be understood in relation to the axis of the aforementioned rotor shaft. For example, "radially outwards" refers to further away from the axis, while "radially inwards" refers to nearer to the axis. The term "circumferential" and derivatives thereof, such as "circumferentially," shall be understood in relation to the axis of the rotor shaft.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 hydromechanical disconnect
101 housing
102 input hub
103 bearing
104 inner bearing nut
105 input housing
106 rotary seal
107 outer bearing nut
108 output housing
109 manifold
110 gasket
111 oil control valve
112 sensor
113 tube-to-housing seal
114 return spring
115 output hub
116 hub-to-housing seal
117 output tube
119 hub-to-tube seal
120 pin

122 one-way mode
123 passthrough mode
124 blocked mode
125 advance chamber
126 retract chamber
135 manifold retract port
136 manifold advance port
140 input-housing seal-portion
141 input-housing radial-portion
142 input-housing bearing-portion
143 input-housing threaded-portion
144 output-housing tube-portion
145 output-housing radial-portion
146 output-housing hub-portion
147 output-housing threaded-portion
148 input-hub seal-portion
149 input-hub threaded-portion
150 input-hub bearing-portion
151 input-hub radial-portion
152 input-hub face-spline
153 input-hub through-hole
154 input-hub blind-hole
155 output-hub face-spline
156 output-hub radial-portion
157 output-hub axial-portion
158 inner race
159 outer race
160 spline top-lands
161 spline bottom-lands
162 spline teeth
163 output-tube through-hole
164 output-tube keyway
165 output-tube radial-hole
166 output-housing keyway
167 hydraulic fluid
201 valve spring
202 valve actuator
203 valve ring
204 valve poppet
205 valve-poppet retract port
206 valve-poppet one-way-mode advance port
207 valve-poppet passthrough-mode advance port
208 valve-poppet blocked-mode wall
300 anti-roll bar
301 input rollbar
302 output rollbar

What is claimed:

1. A hydromechanical disconnect comprising:
- a housing comprising an input housing and an output housing, the input housing and the output housing being affixed together;
- an input hub, the input hub and the input housing being rotatably connected, axially connected, and sealed together;
- an output hub, the output hub and the output housing being sealed together;
- an output tube, the output hub and the output tube being affixed, the output tube and the output housing being non-rotatably connected and sealed together, the output hub configured to axially translate relative to the input hub between a non-rotatably connected position and a disconnected position, the input hub and the output hub being non-rotatably connected in the non-rotatably connected position, the input hub being disconnected and configured to rotate relative to the output hub in the disconnected position, the output hub configured to disconnect from the input hub due to torque between the input hub and the output hub, the input hub and the output tube being sealed together,
- a return spring returning the output hub to the non-rotatably connected position;
- an advance chamber defined by the input hub, the input housing, the output housing, the output hub, and the output tube;
- a retract chamber defined by the output housing, the output hub, and the output tube, the output hub separating the advance chamber from the retract chamber, the advance chamber and the retract chamber holding a hydraulic fluid;
- a manifold fluidically coupling the hydraulic fluid between the advance chamber and the retract chamber; and
- an oil control valve controlling axial motion of the output hub relative to the input hub by controlling a flow of the hydraulic fluid through the manifold.

2. The hydromechanical disconnect of claim 1, comprising a bearing, wherein the input hub and the input housing are axially connected and rotatably connected by the bearing.

3. The hydromechanical disconnect of claim 2, comprising an outer bearing nut axially connecting an outer race of the bearing to the input housing, wherein the input housing comprises an input-housing threaded-portion, wherein the output housing comprises an output-housing threaded-portion, wherein the outer bearing nut and the output-housing threaded-portion are each affixed to the input-housing threaded-portion.

4. The hydromechanical disconnect of claim 1, wherein the input hub comprises an input-hub face-spline, wherein the output hub comprises an output-hub face-spline, wherein the input-hub face-spline and the output-hub face-spline are non-rotatably connected in the non-rotatably connected position, wherein torque between the input-hub face-spline and the output-hub face-spline causes the axial motion of the output hub relative to the input hub.

5. The hydromechanical disconnect of claim 4, wherein the input-hub face-spline and the output-hub face-spline comprise spline top-lands, spline bottom-lands, and spline teeth, wherein the spline teeth are circumferentially disposed between and axially connect the spline top-lands and the spline bottom-lands, wherein the input-hub face-spline and the output-hub face-spline are non-rotatably connected by the spline teeth of the input-hub face-spline and the spline teeth of the output-hub face-spline, wherein the spline top-lands of the input-hub face-spline and the spline top-lands of the output-hub face-spline abut when the input-hub face-spline and the output-hub face-spline are disconnected, wherein torque between the spline teeth of the input-hub face-spline and the spline teeth of the output-hub face-spline causes the axial motion of the output hub relative to the input hub.

6. The hydromechanical disconnect of claim 4, wherein the input hub defines an input-hub radial-portion and an input-hub blind-hole, wherein the input-hub face-spline extends axially from the input-hub radial-portion, wherein the input-hub blind-hole is disposed radially inwards of and axially aligned with the input-hub radial-portion, wherein the output tube is sealed to the input-hub blind-hole.

7. The hydromechanical disconnect of claim 1, wherein the output hub is configured to disconnect from the input hub when torque is applied in either direction.

8. The hydromechanical disconnect of claim 1, wherein the return spring is disposed in the retract chamber, wherein the return spring connects between the output hub and the output housing.

9. The hydromechanical disconnect of claim 1, wherein the oil control valve is configurable between a one-way mode, a passthrough mode, and a blocked mode, wherein the output hub is configured to axially translate towards the input hub and is prevented from being axially translated away from the input hub when the oil control valve is configured in the one-way mode, wherein the output hub is configured to axially translate towards and away from the input hub when the oil control valve is configured in the passthrough mode, wherein the output hub is blocked from axially translating towards and away from the input hub when the oil control valve is configured in the blocked mode.

10. The hydromechanical disconnect of claim 9, wherein the input hub is configured to rotate relative to the output hub when the oil control valve is configured in the blocked mode and the output hub is in the disconnected position.

11. The hydromechanical disconnect of claim 9, wherein the one-way mode is a default condition with power off to the oil control valve.

12. The hydromechanical disconnect of claim 9, comprising a sensor configured to control the oil control valve by detecting the output hub.

13. The hydromechanical disconnect of claim 12, wherein the sensor is affixed to the output housing, is configured to detect the output hub is at the disconnected position, and causes the oil control valve to be configured in the blocked mode in response to detecting the output hub is at the disconnected position.

14. The hydromechanical disconnect of claim 1, comprising a pin, wherein the pin non-rotatably connects the output housing and the output tube, wherein the output housing, the output tube, and the pin are configured to balance air pressure within the input hub and the output tube with atmospheric pressure.

15. The hydromechanical disconnect of claim 14, wherein the pin is affixed to the output tube, wherein the output tube defines an output-tube keyway, wherein the output housing defines an output-housing keyway, wherein the pin fluidically couples the output-tube keyway and the output-housing keyway, wherein the pin is configured to axially translate along the output-housing keyway with axial translation of the output hub and the output tube.

16. The hydromechanical disconnect of claim 1, wherein the oil control valve comprises a valve spring, a valve actuator, a valve ring, and a valve poppet.

17. The hydromechanical disconnect of claim 1, comprising a rotary seal dynamically sealing the input hub to the input housing, a tube-to-housing seal affixed to the output housing and sealing the output tube to the output housing, a hub-to-housing seal affixed to the output hub and sealing the output hub to the output housing, a hub-to-tube seal affixed to the output tube and sealing the output tube to the input hub.

18. The hydromechanical disconnect of claim 1, wherein the housing houses the input hub, the output hub, the output tube, the return spring, the advance chamber, and the retract chamber.

19. The hydromechanical disconnect of claim 1, wherein the manifold defines a manifold retract port and a manifold advance port, wherein the advance chamber and the retract chamber are fluidically connected to respective of the manifold advance port and the manifold retract port, wherein the manifold retract port and the manifold advance port extend through the output housing and are uncovered by the output hub in the non-rotatably connected position and the disconnected position.

20. An anti-roll bar comprising:

a hydromechanical disconnect comprising:

- a housing comprising an input housing and an output housing, the input housing and the output housing being affixed together;
- an input hub, the input hub and the input housing being rotatably connected, axially connected, and sealed together;
- an output hub, the output hub and the output housing being sealed together;
- an output tube, the output hub and the output tube being affixed, the output tube and the output housing being non-rotatably connected and sealed together, the output hub configured to axially translate relative to the input hub between a non-rotatably connected position and a disconnected position, the input hub and the output hub being non-rotatably connected in the non-rotatably connected position, the input hub being disconnected and configured to rotate relative to the output hub in the disconnected position, the output hub configured to disconnect from the input hub due to torque between the input hub and the output hub, the input hub and the output tube being sealed together,
- a return spring returning the output hub to the non-rotatably connected position;
- an advance chamber defined by the input hub, the input housing, the output housing, the output hub, and the output tube;
- a retract chamber defined by the output housing, the output hub, and the output tube, the output hub separating the advance chamber from the retract chamber, the advance chamber and the retract chamber holding a hydraulic fluid;
- a manifold fluidically coupling the hydraulic fluid between the advance chamber and the retract chamber; and
- an oil control valve controlling axial motion of the output hub relative to the input hub by controlling a flow of the hydraulic fluid through the manifold;

an input rollbar affixed to the input hub; and an output rollbar affixed to the output tube.

* * * * *